United States Patent [19]
Tanaka

[11] Patent Number: 5,691,725
[45] Date of Patent: Nov. 25, 1997

[54] DISTANCE MEASURING APPARATUS CAPABLE OF MEASURING PLURAL DISTANCE DATA FOR CALCULATED ANGLE RANGES

[75] Inventor: Shoichi Tanaka, Tokyo, Japan

[73] Assignee: Mitsubishi Denki Kabushiki Kaisha, Tokyo, Japan

[21] Appl. No.: 609,904

[22] Filed: Feb. 29, 1996

[30] Foreign Application Priority Data

Sep. 8, 1995 [JP] Japan .................................. 7-231421

[51] Int. Cl.$^6$ .................................................. G01S 13/06
[52] U.S. Cl. .................................... 342/126; 342/133
[58] Field of Search .................................... 342/126, 133

[56] References Cited

U.S. PATENT DOCUMENTS 4,806,936  2/1989  Williams et al. .................... 342/126

FOREIGN PATENT DOCUMENTS

| 3-6473 | 1/1991 | Japan | G01S 13/93 |
| 3-30117 | 4/1991 | Japan | G01S 17/88 |
| 395979 | 9/1991 | Japan | G01S 17/88 |

Primary Examiner—Daniel T. Pihulic
Attorney, Agent, or Firm—Sughrue, Mion, Zinn, Macpeak & Seas, PLLC

[57] ABSTRACT

In a distance measuring apparatus, a large number of distance data within a certain calculation angle region are acquired so as to obtain distance data with high reliability. The distance measuring apparatus is comprised of: a transmitter/receiver device including at least one of a transmitter for projecting electromagnetic waves while scanning the electromagnetic waves, and a receiver for receiving reflection waves of the electromagnetic waves reflected from an object while scanning the reflection waves; an angle detecting apparatus for detecting at least one of an angle when the electromagnetic waves are projected and an angle when the reflection waves are received; a distance calculating apparatus for calculating a distance up to the object corresponding to the angle based upon a relationship between the electromagnetic waves and the reflection waves, and for using a calculation result as detection data; and a data processing apparatus for acquiring distance data in a calculation angle region corresponding to a plurality of the distance calculations based upon the detection data obtained during a plurality of distance calculations.

20 Claims, 21 Drawing Sheets

DISTANCE MEASURING APPARATUS CAPABLE OF MEASURING PLURAL DISTANCE DATA FOR CALCULATED ANGLE RANGES

BACKGROUND OF THE INVENTION

1. Field of the Invention

The present invention relates to a distance measuring apparatus capable of detecting a distance measured from an object (target) by receiving electromagnetic waves reflected from the object.

2. Description of the Related Art

Conventionally, in this sort of distance measuring apparatus, electromagnetic waves are transmitted toward an object while scanning these electromagnetic waves, and electromagnetic waves reflected from the object are received, so that the distance from this distance measuring apparatus to the object along the scanning direction for every scanning angle is detected. Such a conventional distance measuring apparatus is disclosed in Postexamined Japanese Patent Publication No. 3-6473 and No. 3-30117, both published in 1991.

Since the electromagnetic waves are projected while being scanned in such a conventional distance measuring apparatus, there is a certain possibility that only a portion of the projected electromagnetic waves impinges on the object, depending upon the scanning angle. This problem will now be explained with reference to a drawing FIG. 24 is an explanatory diagram for explaining this conventional problem. In FIG. 24, an object (target) 3 located in a calculation angle region A1 within a scanning angle range A reflects a major portion of electromagnetic waves projected from a distance measuring apparatus 1, so that the reflected electromagnetic waves can be sufficiently obtained so as to acquire the correct distance data. On the other hand, only a portion of projected electromagnetic waves impinges on the object 3 located in another calculation angle region A2. As a result, the electromagnetic waves reflected from the object 3 cannot be sufficiently obtained, and thus errors in the distance data are increased. Accordingly, there is a problem that the correct distance data cannot be acquired in the calculation angle region A2. There is another problem that since the distance data in the calculation angle region is acquired during a single measurement, limited distance information is acquired, resulting in poor reliability of the distance data.

SUMMARY OF THE INVENTION

The present invention has been made to solve the above-described problems, and therefore, has an object to provide a distance measuring apparatus capable of satisfying the below-mentioned items:

1) A scanning operation is performed within a certain calculation angle region to calculate a distance plural times, thereby producing detection data. Based on the detection data, distance data can be obtained with respect to each of the calculation angle regions. Based upon a large number of information, namely a large number of detection data, the distance data is calculated, so that reliability thereof can be improved.

2) The high reliability of the distance data can be obtained.

3) The distance data can be determined by the proper manner in accordance with the reliability of the resultant distance data.

4) The distance data probably containing the lower reliability can be invalidated.

5) The distance data possibly containing the lower reliability may be replaced by the adjacent distance data possibly containing the higher reliability, so that the distance data possibly containing the lower reliability can be removed.

A distance measuring apparatus of the present invention comprises: a transmitter/receiver device including at least one of the transmitter for projecting electromagnetic waves while scanning the electromagnetic waves, and a receiver for receiving reflection waves of the electromagnetic waves reflected from an object while scanning the reflection waves; an angle detecting device for detecting at least one of an angle when the electromagnetic waves are projected and an angle when the reflection waves are received; a distance calculating device for calculating a distance up to the object corresponding to the angle based upon a relationship between the electromagnetic waves and the reflection waves, and for using a calculation result as detection data; and a data processing device for acquiring distance data in a calculation angle region corresponding to a plurality of the distance calculations based upon the detection data obtained during a plurality of distance calculations.

Further, it is provided a data process determining device for determining a process of the distance data based on a value and a number of the detection data within the calculation angle region.

Furthermore, the distance calculating device calculates the distance up to the object based on time measured from the projection of the electromagnetic waves to the reception of the reflection waves, thereby using the calculated distance as the detection data.

Furthermore, the transmitter modulates the electromagnetic waves with a predetermined modulation signal to thereby project the modulated electromagnetic waves; and the distance calculating device calculates the distance up to the object based upon a phase difference in the modulation signals of the projected electromagnetic waves and the received reflection waves, thereby using the calculated distance as the detection data.

Furthermore, it is provided a reliability calculating device for calculating reliability of the distance data in a relevant calculation angle region based on the detection data within the relevant calculation angle region.

Furthermore, it is provided a data process determining device for determining a process of the distance data based on at least one of the detection data and the distance data within the calculation angle region.

Moreover, the data process determining device invalidates the distance data when at least one of the detection data and the distance data within the calculation angle region cannot satisfy a preselected condition.

Moreover, the data process determining device invalidates the distance data when the reliability of the distance data is lower than a preselected value.

Moreover, the data process determining device invalidates the distance data in the relevant calculation angle region when the number of detection data within the calculation angle region is smaller than a preselected value. The predetermined value may be determined in accordance with the distance data within the relevant calculation angle region.

Still further, when an absolute value of a difference between a distance data value in a first calculation angle region and a distance data value in a second calculation angle region is smaller than a preselected value, the data process determining device invalidates distance data of such a calculation angle region where the number of detection data among the distance data of the first and second calculation angle regions is small.

Still further, when the number of detection data in the calculation angle region is smaller than a predetermined value and also a distribution for angles of the detection data in the calculation angle region is deviated more than a predetermined value, the data process determining device invalidates the distance data in the calculation angle region.

Still further, when the times at which the distance data are continuously obtained in the same calculation angle region by a preselected scanning operation time is smaller than a predetermined time, the data process determining device invalidates all of the distance data in the relevant calculation angle region.

Still further, when a temporal change in values of distance data acquired from the same calculation angle region by a preselected number of scanning operation is larger than a predetermined value and also the number of detection data corresponding to the distance data is smaller than a preselected value, the data process determining device invalidates the distance data.

Still further, when the detection data of the first calculation angle region does not satisfy a predetermined condition but the detection data of the second calculation angle region located adjacent to the first calculation angle region satisfies the predetermined condition, the data process determining device replaces the distance data in the first calculation angle region by the distance data in the second calculation angle region.

Still further, when reliability of the distance data in the first calculation angle region is smaller than a predetermined value, and reliability of the distance data in the second calculation angle region located adjacent to the first calculation angle region is larger than the predetermined value, the data process determining device replaces the distance data in the first calculation angle region by the distance data in the second calculation angle region.

Still further, when the number of detection data within the first calculation angle region is smaller than the number of detection data within the second calculation angle region, the data process determining device replaces the distance data in the first calculation angle region by the distance data in the second calculation angle region.

Still further, when the number of detection data in the first calculation angle region is smaller than the number of detection data in the second calculation angle region and also a difference in the values of the distance data in the first and second calculation angle regions is smaller than a predetermined value, the data process determining device replaces the distance data in the first calculation angle region by the distance data in the second calculation angle region.

DETAILED DESCRIPTION OF THE PREFERRED EMBODIMENTS

FIRST EMBODIMENT

Figure 1:
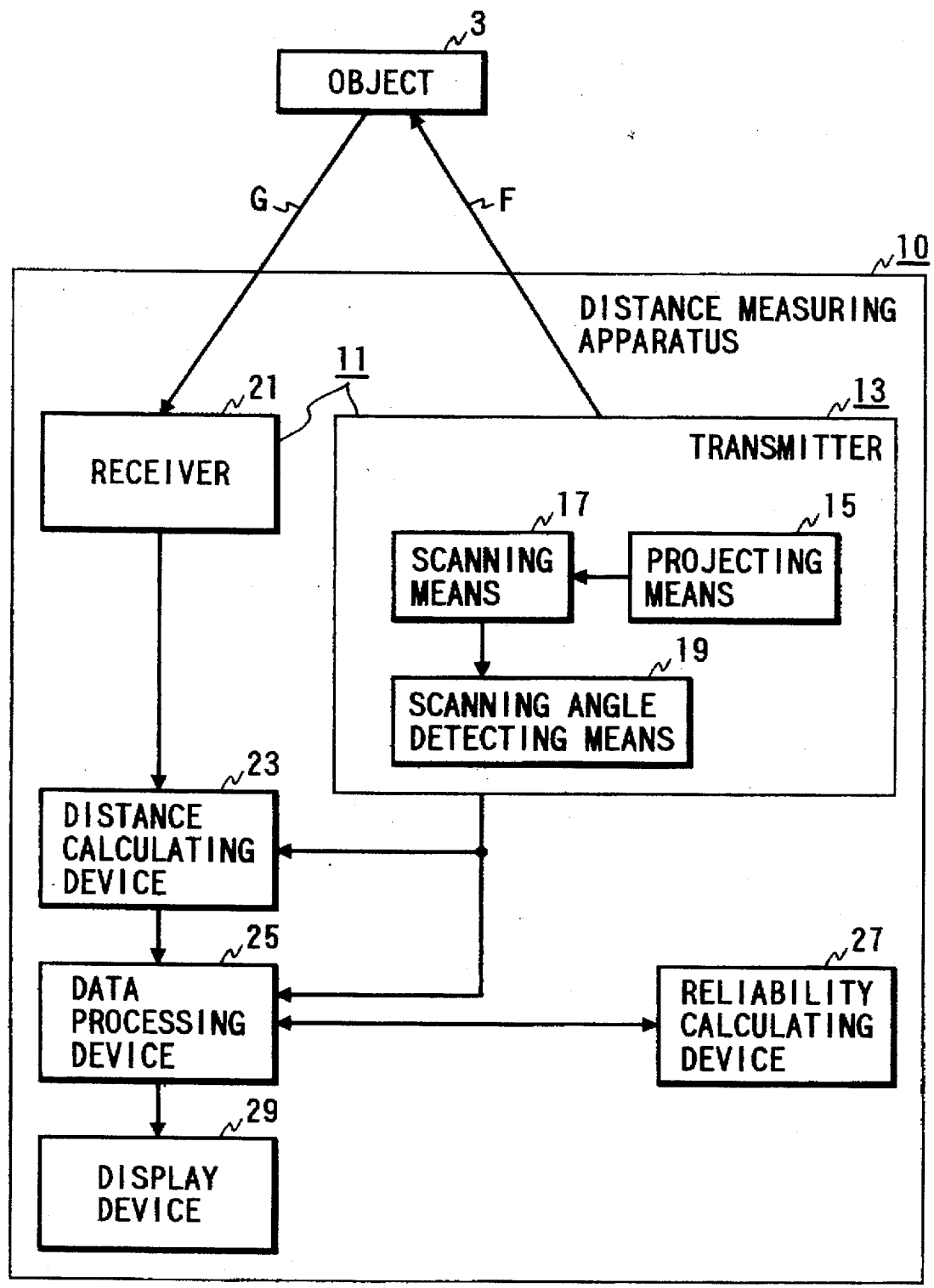
FIG. 1 is a schematic block diagram for showing an arrangement of a distance measuring apparatus according to an embodiment of the present invention.
Figure 2:
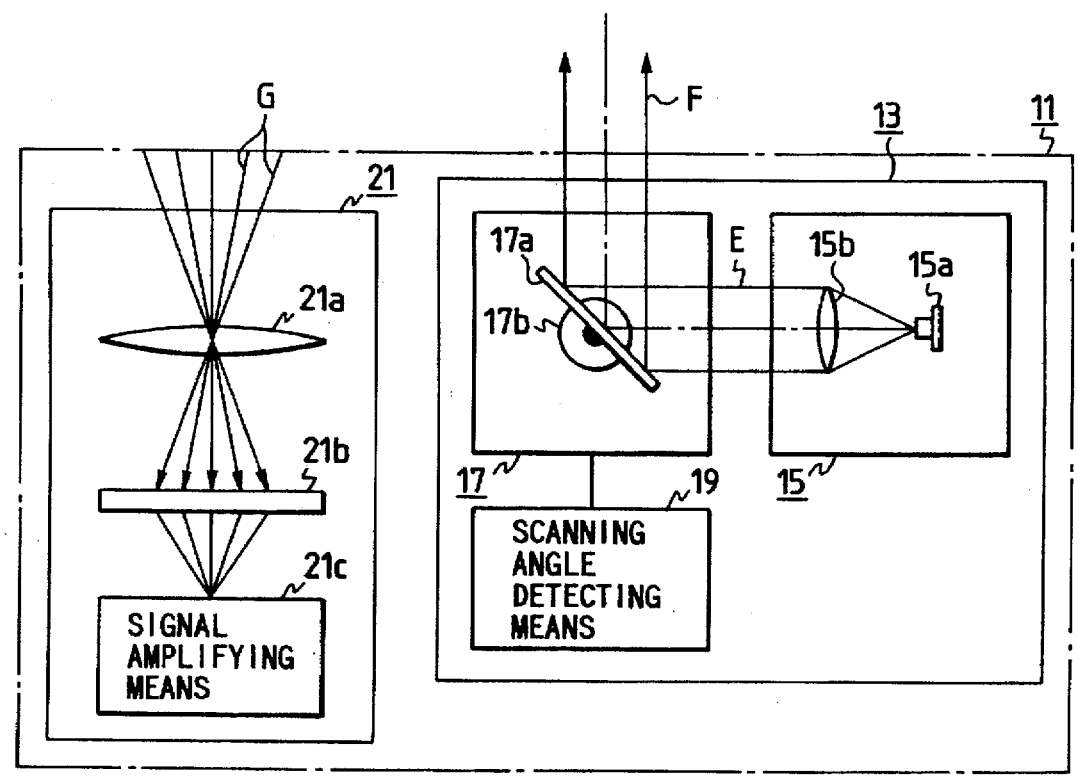
FIG. 2 schematically represents a detailed arrangement of a transmitter/receiver device employed in the distance measuring apparatus of FIG. 1.
Figure 3:
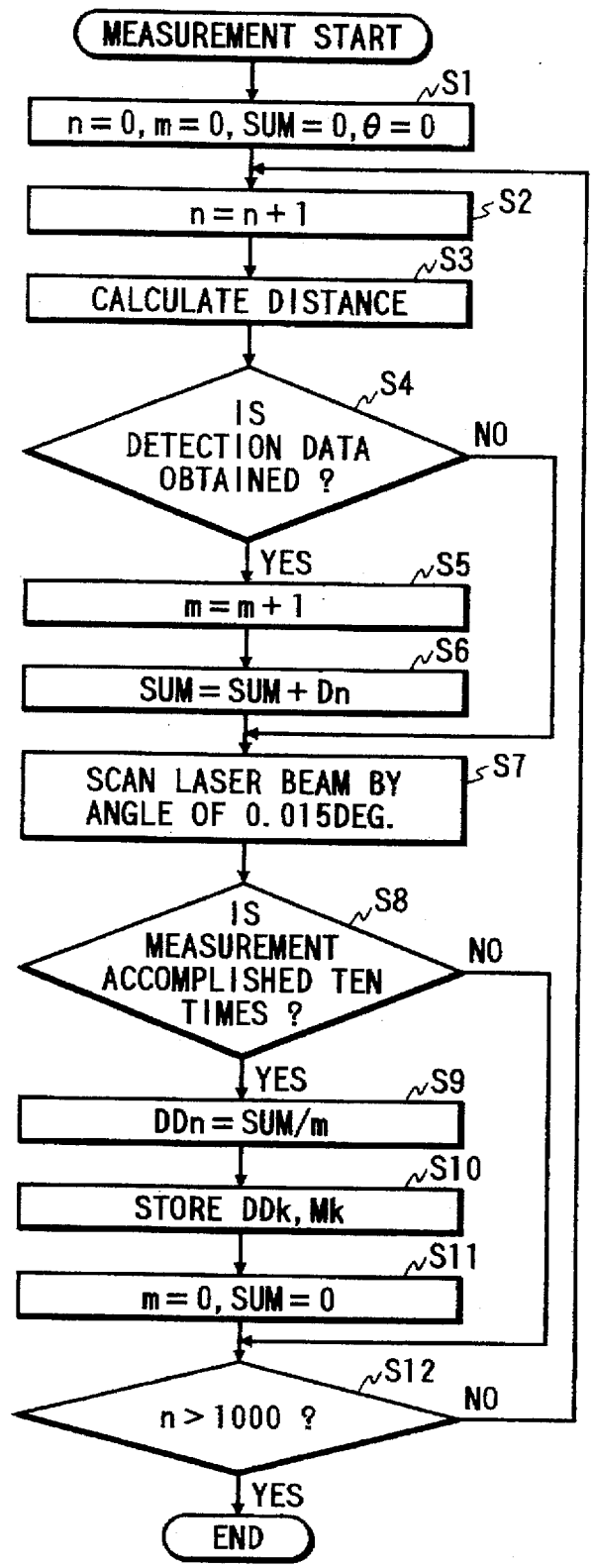
FIG. 3 is a flow chart for explaining operations of the distance measuring apparatus of FIG. 1.
Figure 4:
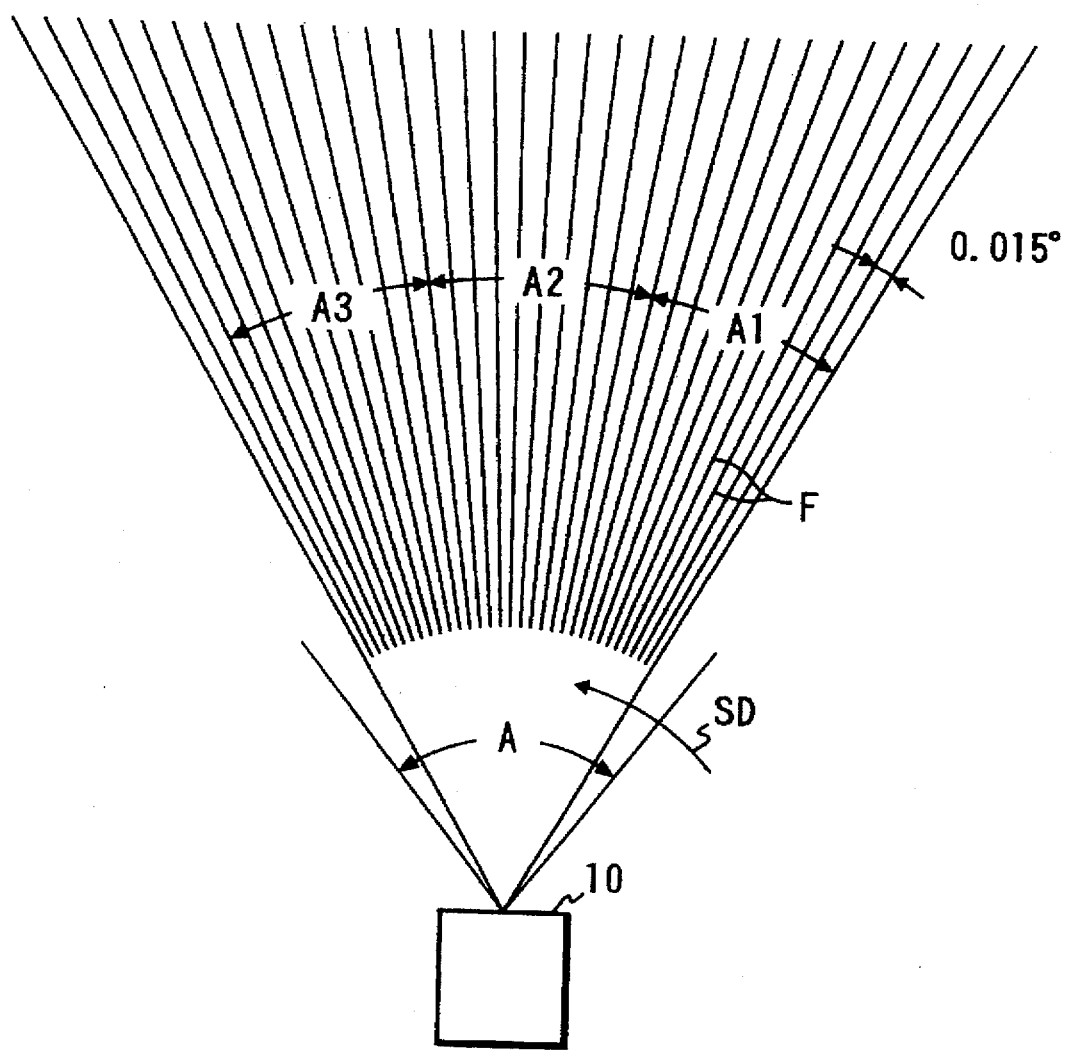
FIG. 4 is an explanation diagram for explaining a scanning section.
Figure 5:
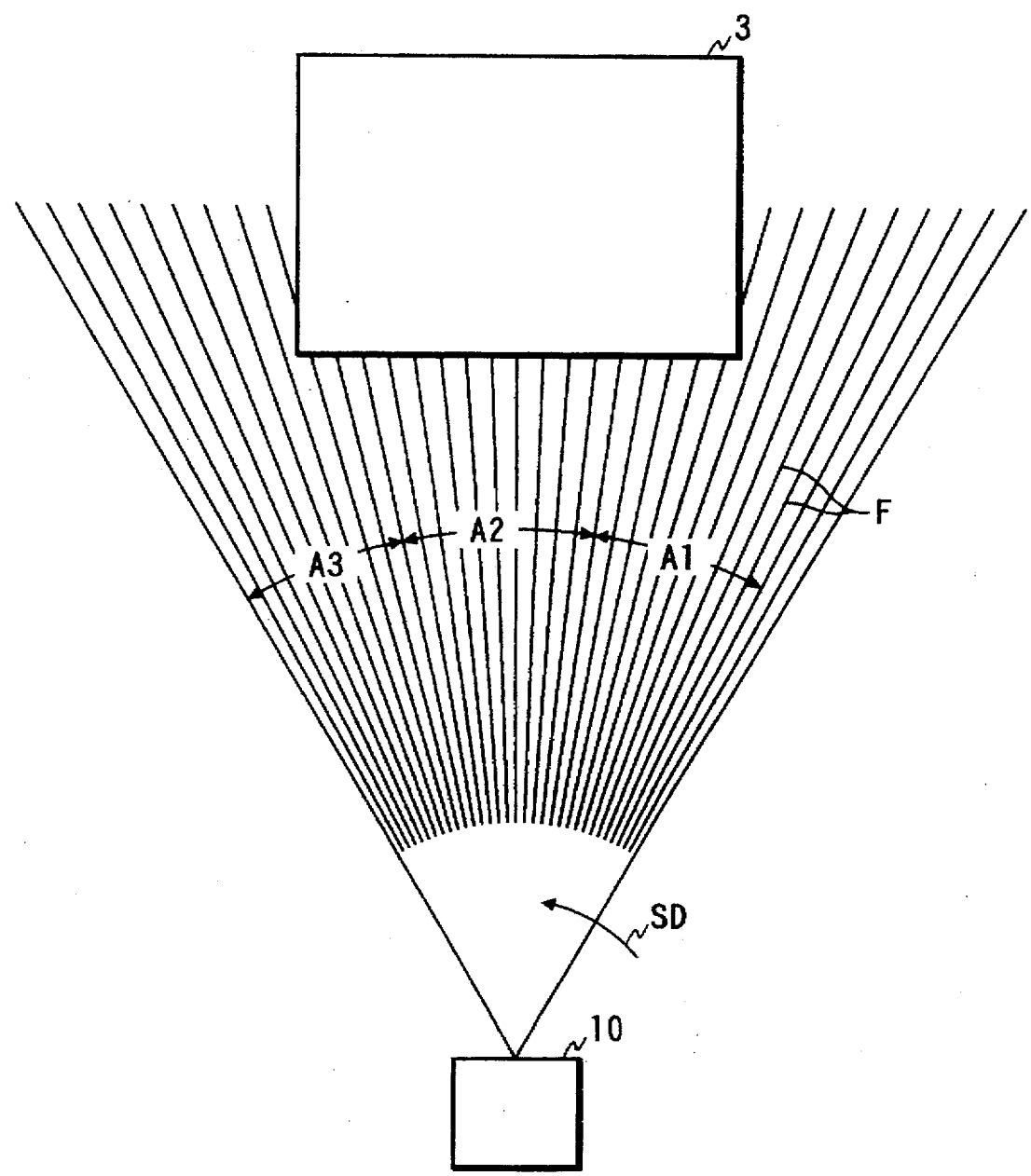
FIG. 5 is an explanation diagram for explaining a distance measuring condition.

FIG. 1 to 5 represent a distance measuring apparatus according to an embodiment of the present invention. That is, FIG. 1 is a schematic block diagram for showing an arrangement of this distance measuring apparatus, FIG. 2 is a schematic block diagram for indicating a detailed arrangement of a transmitter/receiver device employed in this distance measuring apparatus, FIG. 3 is a flow chart for explaining operations of this distance measuring apparatus, FIG. 4 is an explanatory diagram for explaining a scanning section used in this apparatus, and FIG. 5 is an explanatory diagram for explaining conditions of the distance measurement performed in this apparatus.

In these drawings, reference numeral 10 indicates the distance measuring apparatus. The distance measuring apparatus 10 is arranged as follows. Reference numeral 11 indicates a transmitter/receiver device having a transmitter 13 and a receiver 21. The transmitter 13 includes a projecting means 15, a scanning means 17, and a scanning angle detecting means 19. The projecting means 15 has a laser diode 15a and a light feeding lens 15b. The laser diode 15a emits pulse laser light in an infrared ray range that is one sort of electromagnetic waves. The light feeding lens 15b condenses the pulse laser light E emitted from the laser diode 15a to form laser beam F having a very narrow extend angle of 0.05 degrees (see FIG. 2) with respect to the scanning direction in this embodiment.

The scanning means 17 includes a light feeding mirror 17a for reflecting the laser beam F projected from the projecting means 15, and a stepper motor 17b for swinging this light feeding mirror 17a so as to scan the laser beam 7. In the scanning means 17, the light feeding mirror 17a is arranged in such a manner that a center angle of the incident laser beam F which has been shaped becomes 45 degrees, and this incident laser beam is scanned along the right/left direction. The swing angle (step angle) $\Delta\theta$ of the stepper motor 17b one time is selected to be 0.015 degrees, and the scanning angle range is selected to be 15 degrees. Although the detailed description will be made later, the transmitter 13 transmits the laser beam F every time the stepper motor 17b is rotated by 1 step equal to 0.015 degrees so as to calculate a distance from this transmitter to an object (target). Then, 10 sets of distance calculations are carried out, namely the distance data is calculated, while using 0.15 degrees as the calculation angle region. As a consequence, the distance calculation is carried out 1,000 times within the scanning angle range of 15 degrees, so that 100 pieces of distance data are acquired. That is, in this case, the scanning angle range is divided into a hundred calculation angle regions.

The scanning angle detecting means 19 detects the swing angle $\theta$ of the light feeding mirror 17a of the scanning means 17. The receiver 21 includes a convex lens 21a, a photodiode 21b, and a signal amplifying unit 21c. The photodiode 21b is arranged at a focusing position of the convex lens 21a. Then, the laser beam F is emitted from the laser diode 15a, the scanning means 17 impinges on, or collides the object 3 (see FIG. 5), and the reflection pulse light "G" reflected from the object 3 is condensed by the convex lens 21a.

Furthermore, the condensed reflection pulse light G is converted into an electric signal by the photodiode 21b, and then this electric signal is amplified by the signal amplifying unit 21c. The amplified signal is supplied to a distance calculating device 23.

Reference numeral 23 indicates a distance calculating device which measures light during the time defined from the pulse emitting time of the laser diode 15a to the light receiving time of the reflection pulse light G received by the receiver 21, and calculates the distance up to the object as the detection data Dn.

Reference numeral 25 denotes a data processing device. In the data processing device 25, a predetermined swing time of the stepping motor 17b is used as a single calculation angle region AK, and the distance data DDk in this calculation angle region is obtained from the detection data Dn acquired by the distance calculating device 23. A reliability calculating device 27 calculates reliability Rk of the distance data DDk in this calculation angle region based upon the times at which the detection data Dn are acquired for every calculation angle region, namely a number "m" of the detection time. Reference numeral 29 is a display device which displays both of the distance data DDk and the reliability Rk for every calculation angle region Ak.

Next, operations of the distance measuring apparatus with the above-described arrangement, according to the embodiment 1 of the present invention, will now be described. The projecting means 15 pulsatorily drives the laser diode 15a in a time period of 100 microseconds to emit pulse laser light E (see FIG. 2) having a short time width of approximately 30 nanoseconds. Generally speaking, the pulse laser light E emitted from the laser diode 15a is a laser beam with not sharp directivity. By condensing this pulse laser light E by way of the light feeding lens 15b, a laser beam having a very narrow width with respect to the scanning direction is produced, for instance, a laser beam F with extend angles having 0.05 degrees along the scanning direction and 4 degrees along the upper/lower direction.

The light feeding mirror 17a is driven by the stepper motor 17b so as to scan the incident laser beam F along a direction SD toward the scanning angle range A (see FIGS. 4 and 5).

It should be noted that the reason why the extend angle of the laser beam F is selected to 0.05 degrees, which is about three times larger than the scanning step angle 0.015, is to perform the scanning operation to overlap step by step in order not to produce a leakage (space) of the scanning operation.

The laser beam F reflected/transported at the light feeding mirror 17a impinges at the object (target) 3 and thereafter is reflected from this object 3. The reflected laser beam is incident upon the receiver 21 as reflection pulse light G. The receiver 21 photoconverts the reflection pulse light G into the corresponding pulse signal which will be entered into the distance calculating device 23. The distance calculating device 23 calculates time "$\Delta t$" defined from a time instant when the pulse laser light E is emitted from the laser diode 15a until a time instant when this reflected pulse light G is received and entered as the electric signal by/into the receiver 15. Furthermore, the light velocity (i.e., $3 \times 10^8$ [m/s]) is multiplied with a half of the measured time $\Delta t$ to calculate the distance up to the object 3 as the detection data.

On the other hand, the light feeding mirror 17a employed in the scanning means 17 is swung in such a manner that the laser beam is scanned by the scanning angle of 0.015 degrees every time the above-explained distance calculation is carried out. The scanning angle detecting means 19 detects the scanning angle $\theta$ from the swing angle of the light feeding mirror 17a. The data processing device 25 processes both of the detection data Dn derived from the distance calculating device 23 and the scanning angle $\theta$ derived from the scanning angle detecting means 19, and then calculates the distance data DDk in the respective calculation angle regions Ak.

It should also be noted that the above-described distance calculating device 23, data processing device 25 and reliability calculating device 27 may be realized by way of a read-only memory (ROM) for previously storing therein a program (will be discussed later), a random access memory (RAM) for temporarily storing therein the calculated detection data Dn and the calculated distance data DDk, and a microprocessor (CPU) for performing various sorts of calculations and judgments.

Referring now to a flow chart shown in FIG. 3, the operations of this distance measuring apparatus 10 will be described more in detail. In FIG. 3, symbol "n" indicates a number of distance measuring (n:1 to 1,000) during one scanning operation within the scanning angle range A, and symbol "m" denotes a number of detection of the detection data Dn obtained when the distance can be calculated by the calculation, and the calculation result is obtained as the detection data within a single calculation angle region Ak, for example, a calculation angle region of 1.5 to 1.65 (1.5+0.015×10) degrees. Symbol "SUM" denotes a summation of the detected data Dn acquired in a single calculation angle region Ak, and symbol "θn" represents a scanning angle.

At a step S1 of this flow chart, the data processing device 25 performs an initializing to set these symbols n, m, SUM and θn to zero. At a step S2, 1 is added to the number of measuring. At a step S3, the laser diode 15a of the projecting means 15 is emitted to transmit the laser beam F, and then based on the reception time delay of the reflected pulse light G received by the receiver 21, a calculation is made of a distance in the distance calculating device 23. In the case that the reflected pulse light G is a sufficiently higher strength than a predetermined value, the distance data Dn can be obtained by performing the above-described calculation. To the contrary, when the strength of the reflected pulse light G is weak, such a distance calculation cannot be carried out, so that no detection data Dn is obtained. At this time, the detection data Dn has an infinite value.

At a step S4, a judgment is done as to whether or not the detection data Dn is obtained. When the detection data Dn is acquired, the process operation is advanced to a step S5 at which 1 is added to the number "m" of the detection time. Furthermore, at a step S6, the value of this detection data Dn is added to the summation SUM of the detection data Dn.

When it is so judged at the step S4 that the detection data Dn could not be obtained by the distance calculating device 23, the process operation is advanced to a step S7. At this step S7, a signal is supplied to the scanning means 17 so as to pivot the angle of the light feeding mirror 17a by 0.015 degrees, so that the scanning angle is set to θn+0.015 degrees.

At a step S8, a check is done as to whether or not the data processing device 25 repeatedly performs the distance measuring operations 10 times. Every time this distance measuring operations are repeated 10 times, the summation SUM of the detection data Dn obtained by the calculation is divided by the detection number "m" to calculate an average value at a step S9. It should be understood that the detection data Dn cannot be always obtained every time the distance measurement is carried out 10 times. When the detection data Dn cannot be obtained, since the detection data Dn owns the infinite value, this infinite value is excluded.

At the step S9, the average value of the detection data Dn is stored together with the data Mk about the number "m" of the detection data Dn as the respective distance data DDk in a single calculation angle region Ak (k=1, 2, 3, ..., 10). At a step S11, the summation "SUM" of the detection number "m" and the detection data Dn is reset to zero. Further, a check is done as to whether or not the number "n" of the distance measuring time is less than 1,000 at a step S12. If the number "n" of the distance measuring time is less than 1,000, then the process operation is returned to the previous step S2 at which the distance measuring operation is carried out at the next scanning angle θ(n+1). When the number "n" of the distance measuring time becomes 1,000, a single scanning operation within the scanning angle range is complete.

As previously described, since the laser beam F is scanned at the angle of 0.015 degrees during a single distance measuring operation, as illustrated in FIG. 5, the angle scanned while the distance measuring operation is carried out 10 times becomes 0.015 degrees. The distance data DDk calculated by the data processing device 25 corresponds to the average distance up to the object present in the calculation angle region at the angle of 0.15 degrees. The scanning operation with the scanning angle of 0.015 degrees is carried out 1,000 times, so that the overall scanning angle range becomes 15 degrees. As a consequence, as the distance data DDk, 100 pieces of distance data DD1 to DD100 are acquired, and then the distance data are displayed on the display device 29 in each of the calculation angle region Ak. When the value of the distance data is smaller than, or equal to a predetermined value, a proximity alarm is produced from an alarm device (not shown).

The reliability calculating device 27 expresses a ratio of the number "m" of acquired distance data to the distance measurement times (10 times) in a percent among the distance measuring operations executed 10 times. This number "m" implies the detection number "m" of distance data Dn. This ratio is displayed as reliability Rk [%] of the distance data DDk in the relevant calculation angle region together with the distance data DDk on the display device 29. As the reliability representation, a range defined by R≦30 is determined as low reliability and indicated in orange color, another range defined by 30<R<70 is determined as medium reliability and indicated in yellow color, and another range defined by 70≦R is determined as high reliability and indicated in green color. Since the distance measuring (calculating) operation is carried out 1,000 times, 100 pieces of data M1 to M100 are obtained as the data Mk about the number of the distance detection. It should be noted when no object is present in the relevant calculation angle region, since no distance data cannot be acquired, the infinite (∞) is displayed as the distance data.

FIG. 5 illustrates the distance measurement up to the object 3 by the above-described distance measuring apparatus 10. As represented in FIG. 5, the object 3 is entirely present within the range of the calculation angle region A2. However, in the case that the object 3 is partially present in either the range of the calculation angle region A1, or the range of the calculation angle region A3, the number of the distance detection is 10 times in the calculation angle region A2, the distance detection is 4 times in the calculation angle region A1, and the distance detection is 2 times in the calculation angle region A3.

As previously described in the previous item to solve the problem by the present invention, when the laser beam impinges only a portion of the object and therefore the strength of the reflection pulse light is low, there are some possibilities that the measured distance data may contain errors and/or no distance measurement can be done. As a consequence, the larger "m" of the detection time becomes smaller possibility that the errors are contained in the distance measurement value, resulting in higher reliable distance measurement data.

In this manner, 10 times of distance measurement operations are repeatedly performed to average the entire distance detection data Dn, so that the distance data DDk in one calculation angle region Ak is obtained. Furthermore, the number "m" of the actually detectable distance data is counted among 10 times of the distance measuring operations, so that the reliable distance data within the relevant calculation angle region can be obtained.

Alternatively, only when the reception strength of the reflection pulse light G, namely the level of the signal derived from the receiver 21 is higher than a preselected value, the distance measuring apparatus 22 may calculate the distance to obtain the detection data and may calculate reliability based on the number of this detection data. Moreover, when the strength of the reflection pulse light G is higher than a preselected value, there is high probability that this reflection pulse light corresponds to interference waves originated from another distance measuring apparatus. Therefore, this is excluded from the detection data, and then the distance data and the reliability may be calculated from the resultant detection data.

As previously explained, for instance, when the value of the distance data is smaller than a predetermined value and also the reliability thereof is high, the fuel supply to the engine may be limited, or other control operations such as braking operation may be performed based upon the calculated distance data.

As previously described, in accordance with one preferred embodiment of the present invention, as the distance data DDk in one calculation angle region Ak, the averaged distance value is obtained by repeatedly performing the distance measuring operations in preselected times, and then this averaged distance value is used as the desired distance data DKK. As a consequence, since the distance data within a certain calculation angle region is calculated based upon a plenty of information, namely a large number of detection data, reliability of the resultant distance data can be improved. Moreover, based upon the number of the detection times when the distance up to the object in the calculation angle region could be actually measured, reliability of the distance data within this calculation angle region may be recognized.

Although the scanning means 17 has been realized by driving the light feeding mirror 17a by the stepping motor 17b in the above-described embodiment, this scanning means 17 may be realized by employ a light polarizer and the like.

Also, reliability of the distance data has been represented by the percentage of the number "m" of the detection data in the calculation angle region by the reliability calculating device 27 in the preferred embodiment shown in FIG. 1. A similar effect may be achieved even when the normalized deviation of the detection data in the relevant calculation angle region is obtained.

SECOND EMBODIMENT

Figure 6:
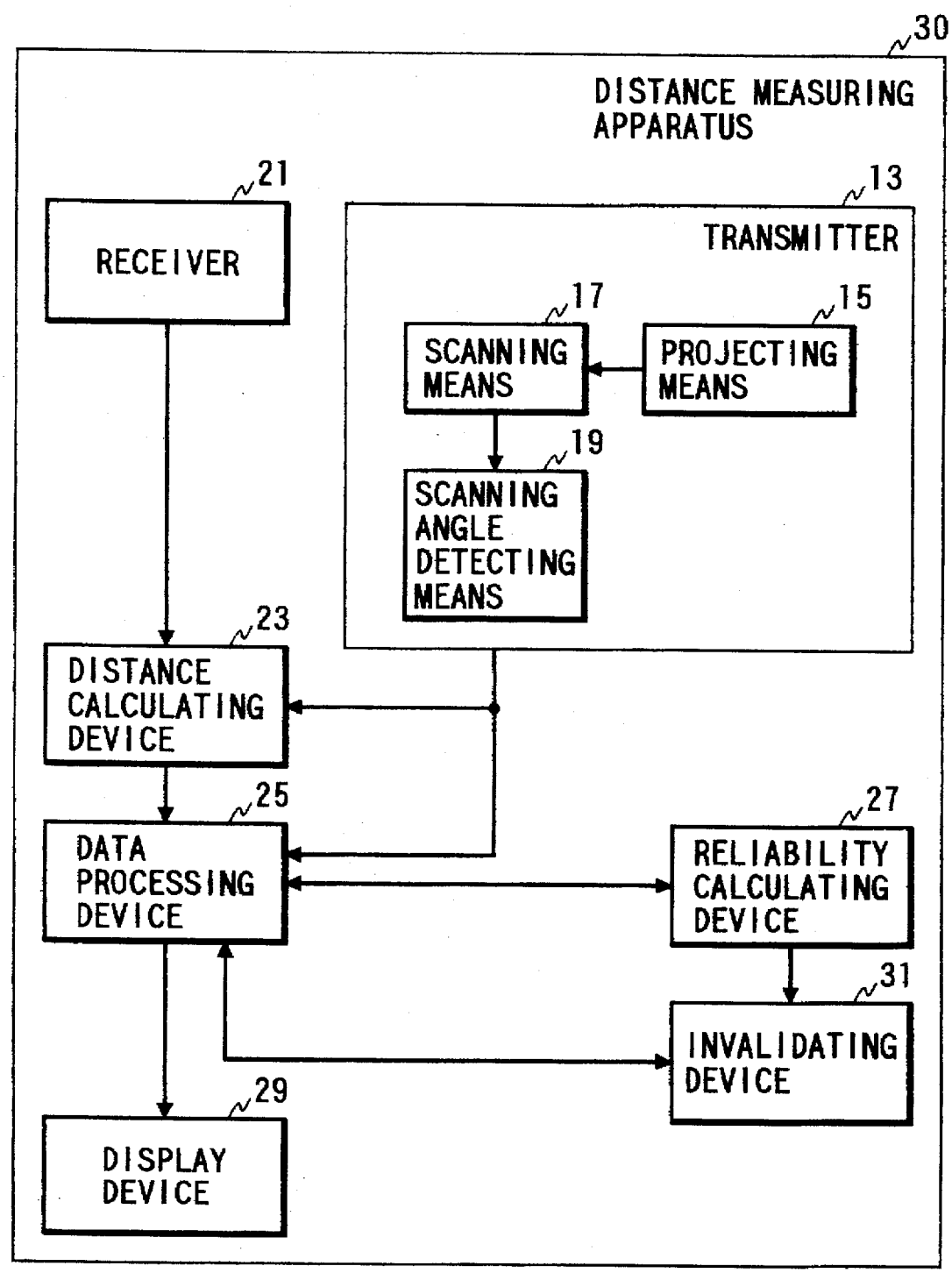
FIG. 6 is a schematic block diagram for indicating a distance measuring apparatus according to another embodiment of the present invention.

When the value of the data Mk about the number "m" of the distance detection time in a certain calculation angle region Ak is smaller than a predetermined number, there are some possibilities that the distance data DDk obtained in this calculation angle region owns low reliability and may contain great errors. Therefore, this distance data DDk is invalidated, so that such distance data possibly containing large errors can be removed. FIG. 6 is a schematic block diagram for representing a distance measuring apparatus arranged by adding an invalidating device 31 to the arrangement of the previous distance measuring apparatus shown in FIG. 1. In FIG. 6, the invalidating device 31 may invalidate such distance data possibly containing the above-described large errors.

Figure 7:
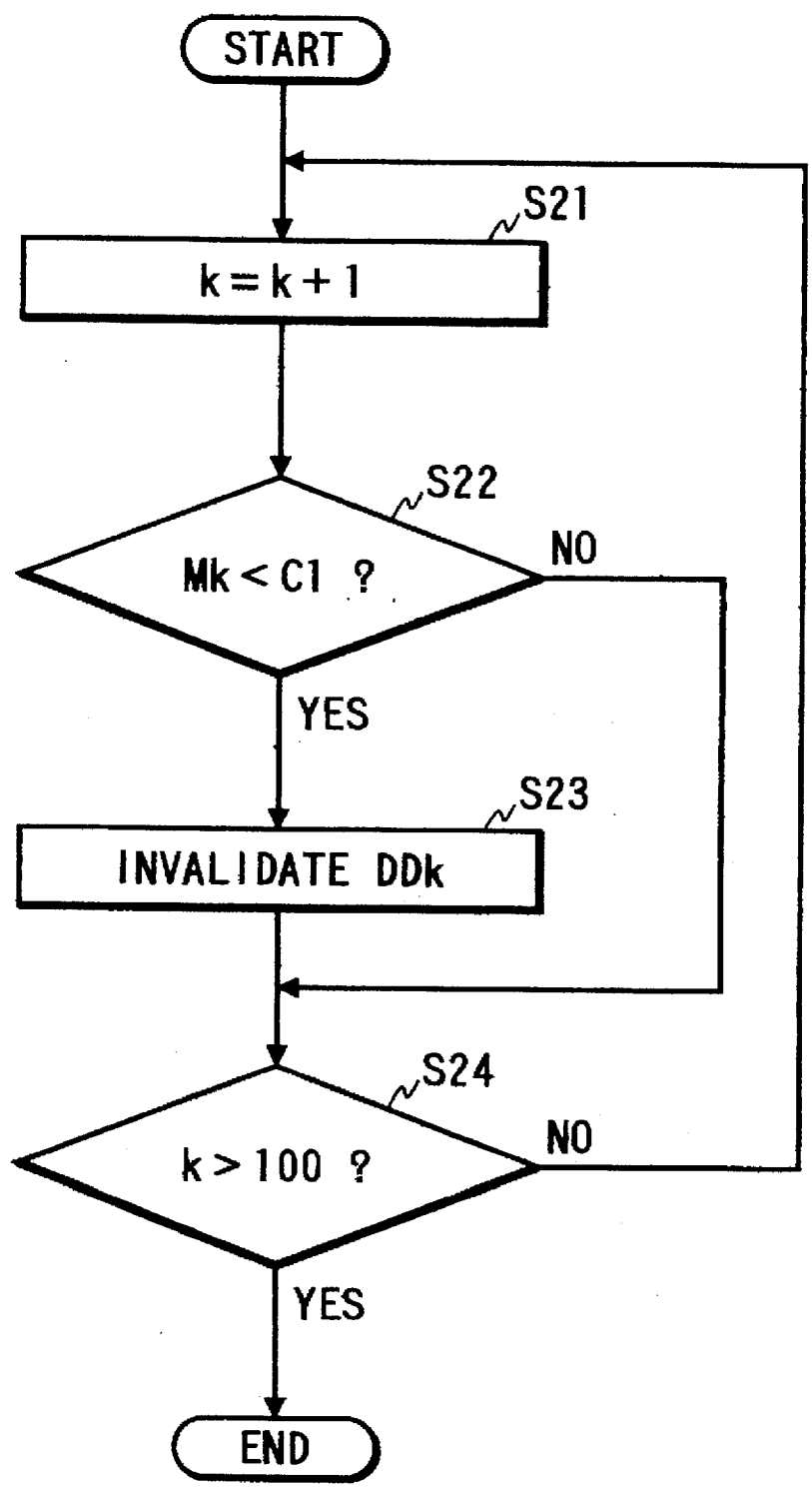
FIG. 7 is a flow chart for describing operations of the distance measuring apparatus shown in FIG. 6.

FIG. 7 is a flow chart for indicating a program stored in a read-only memory (ROM, not shown) employed in the invalidating device 31. Operations will now be explained with reference to FIG. 7. It should be noted that the distance data DDk and the data Mk about the number "m" of the detection time are supplied from the distance calculating device 23 and the data processing device 25, and the invalidating device 31 executes the below-mentioned operation for each of the calculation angle regions Ak.

At a step S21 of the flow chart shown in FIG. 7, 1 is added to "k". Then, at a step S22, a judgment is done as to whether or not the data Mk about the distance detection number "m" (corresponding to reliability Rk of distance data) is smaller than a predetermined value C1, for example, 6 times. When this data Mk is smaller than a predetermined value C1, it is so judged at a step S23 that reliability of the corresponding distance data DDk is low, and thus this distance data DDk is invalidated. At a step S24, if "k" is less than 100, then the process operation is returned to the step S1. This operation is repeated 100 times (k=1 to 100), and the distance data DDk with respect to 100 calculation angle regions, namely every angle regions of 0.15 degrees, is calculated, and then one scanning operation for the scanning angle range of 15 degrees is accomplished (step S24). Although not described in detail, while the invalidated distance data are also temporarily stored, the distance data to be outputted, which involves the above-described invalidated distance data, are displayed via the separately provided register and the data processing device 23 on the display device 29. Then, the effective distance data is displayed and such an indication as to the invalidated distance data is made.

According to the second preferred embodiment of the present invention, the invalidating device 31 is provided. If the time when the detection data are obtained is smaller than a predetermined time, then the distance data calculated based on this detected data is invalidated, so that such distance data possibly containing large errors can be invalidated.

THIRD EMBODIMENT

When data about distance detection time in a certain calculation angle region Ax, namely the value of the data Mx about the number "m" when the detection data D is obtained, is smaller than the value of the data My about the number of the distance detection time in the calculation angle region Ay adjacent to this calculation angle region Ax, the distance data DDx obtained in such a calculation angle region Ax where the number of detection data is smaller than that of another calculation angle region Ay is invalidated under the below-mentioned condition. As a result, only the distance data having higher reliability may be selected. This condition is such that a difference between the distance data DDx in the calculation angle region Ax and the distance data DDy in the calculation angle region Ay is smaller than, or equal to a preselected value.

For instance, in FIG. 5, the distance detection numbers in the calculation angle regions A1 and A3 are less than the distance detection number in the calculation angle region A2. Thus, the distance data DD1 and DD3 acquired in the calculation angle regions A1 and A3 are invalidated, so that such distance data possibly containing large errors which have been acquired under such a condition that the laser beam impinges only a portion of the object can be eliminated. It should be noted that when a difference between the distance data Dx and Dy is larger than a predetermined value, the distance data Dx is not invalidated. This is because this distance data Dx may probably be distance data caused by another object.

Figure 8:
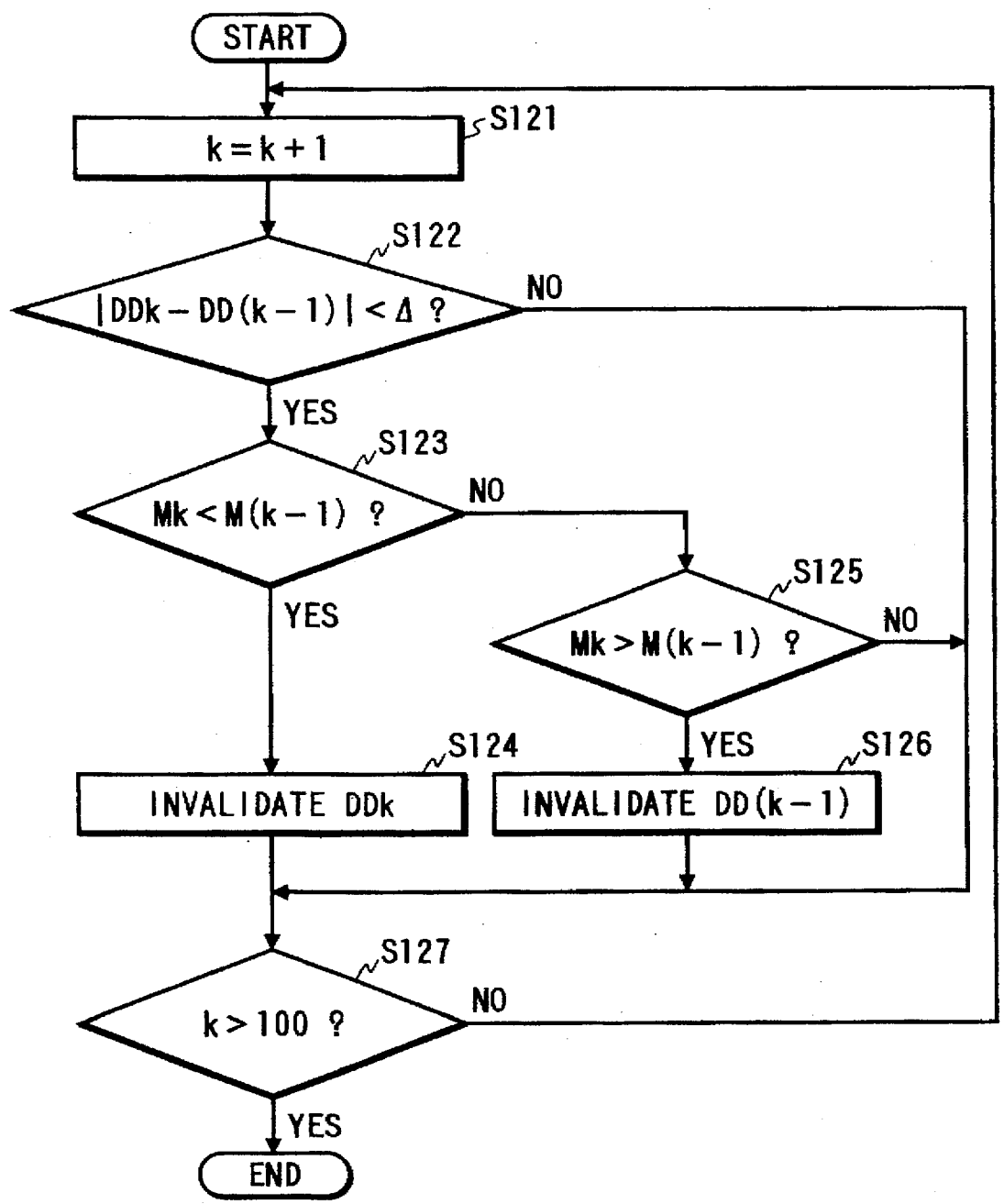
FIG. 8 is a flow chart for indicating operations of an invalidating device employed in the distance measuring apparatus of FIG. 7.

FIG. 8 is a flow chart for describing operations of a distance measuring apparatus employing the invalidating device 31 of FIG. 6 containing the ROM into which another control program has been stored. Under this control program, the above-described distance measuring operations are carried out. The operations of this invalidating device 31 will now be explained with reference to the flow chart of FIG. 8. The invalidating device 31 receives the data Mk about the number "m" of the distance detection time and the distance data DDk (k=1 to 100) from the data processing device 25.

At a step S121 of this flow chart, 1 is added to k. At a step S122, a check is done as to whether or not an absolute value of a difference between the distance data DDk and DD(k−1) is smaller than a predetermined value Δ. These distance data DDk and DD(k−1) are acquired from a calculation angle region Ak functioning as a first calculation angle region and an adjacent calculation angle region A(k−1) functioning as a second calculation angle region. If |DDk−DD(k−1)|<Δ, then the process operation is advanced to a step S123. At this step S123, a judgment is made as to whether or not the detected data number in the first calculation angle regions Ak is larger than that in the second calculation angle regions A(k−1), namely whether or not the data Mk about the distance detection number "m" is larger than the data M(k−1) about the distance detection number "m". When the data Mk about the detection number is smaller than the data M(k−1) about the detection number, the process operation is advanced to a step S124 at which the distance data DDk in this calculation angle region Ak is invalidated.

When the data Mk about the detection number is larger than the data M(k−1) about the detection number, the process operation is advanced from the step S123 to steps S125 and S126 where the distance data DD(k−1) in the calculation angle region A(k−1) is invalidated. When Mk=M(k−1), both of these distance data are not invalidated. In other words, reliability of the distance data in such a calculation angle region where the number of detected data D is small is recognized as a low value, and this distance data is invalidated. If k is smaller than 100, then the process operation is returned to the step S121. This operation is repeatedly carried out 100 times, and the distance data DDk about 100 pieces of calculation angle regions, namely the distance data with respect to every 0.15-degree angle region are calculated, and then a single scanning operation for the 15-degree scanning angle range is complete (step S127).

Although not indicated in the above-described flow chart of FIG. 8, the invalidated distance data DDk are stored as distance data which will then be used in the subsequent comparison. Furthermore, when the distance data is invalidated, this invalidation is indicated via the data processing device 23 on the display device 29 (see FIG. 6). The distance data DDk and the data Mk about the number of the detection time are supplied from the distance calculating device 23 and the data processing device 25 shown in FIG. 1 in real time to the invalidating device 31, and thus this invalidating device 31 executes the above-described operation with respect to each calculation angle region Ak.

According to the third embodiment of this distance measuring apparatus, the invalidating device 31 is employed. When the difference between the distance data acquired from the adjoining calculate angle regions is smaller than a preselected value, such distance data acquired from the calculation angle region where the detected data number is small is invalidated. Accordingly, the distance data possibly containing such errors when the laser beam impinges only a portion of the object can be invalidated, and thus, the distance data having higher reliability can be selected.

FOURTH EMBODIMENT

Figure 9:
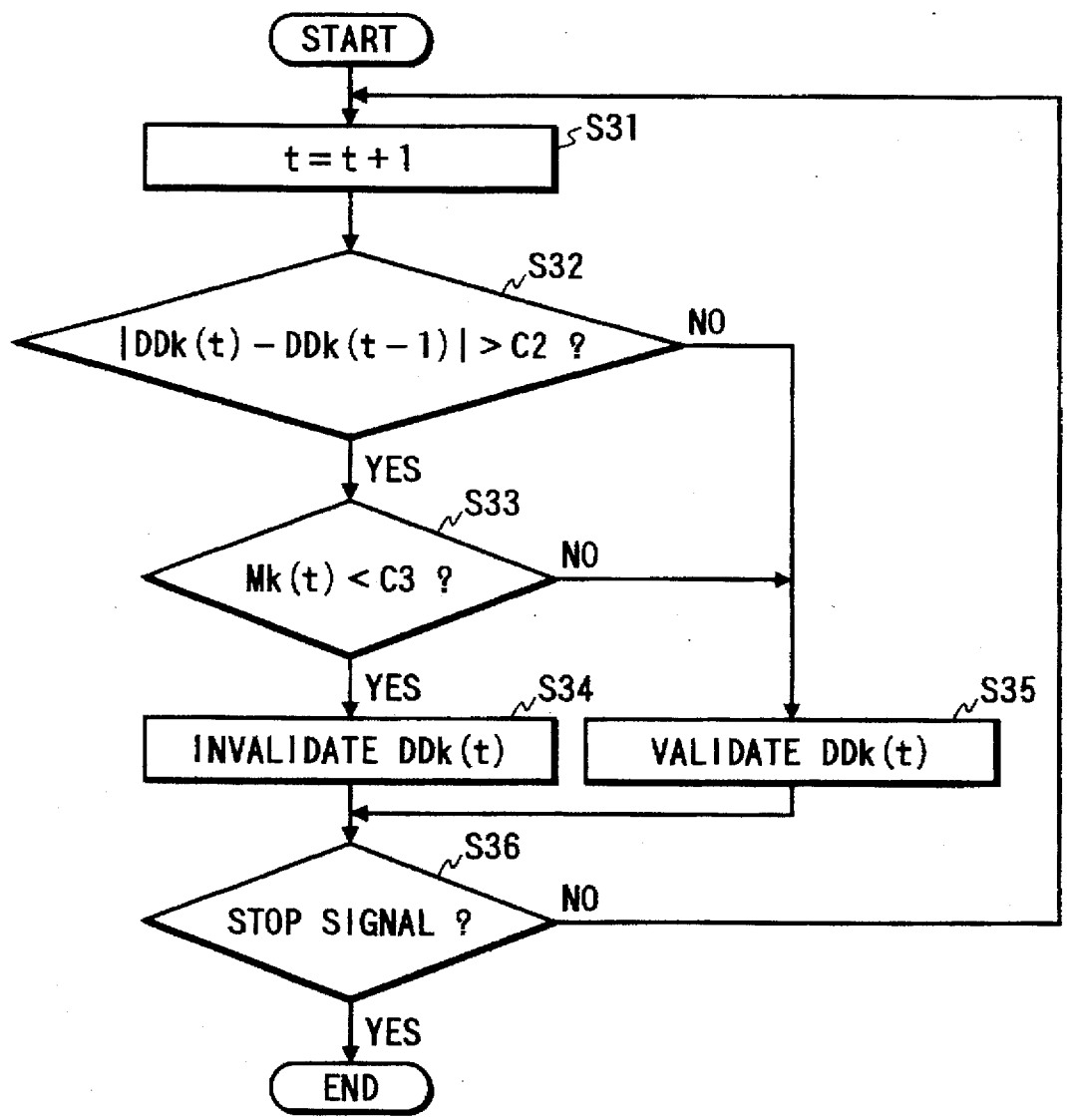
FIG. 9 is a flow chart for indicating operations of an invalidating device employed in the distance measuring apparatus of FIG. 7.
Figure 10:
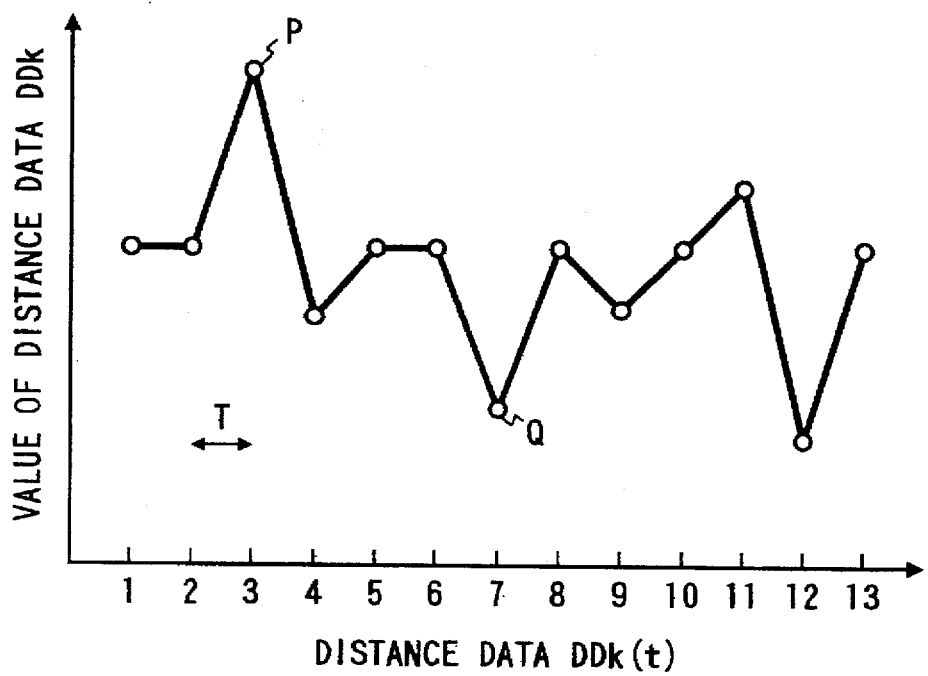
FIG. 10 is an explanatory diagram for describing a variation in distance data within a certain calculation angle region obtained by performing a scanning operation of the invalidating device shown in FIG. 9 by a preselected scanning time.

FIG. 9 and FIG. 10 represents another distance measuring apparatus according to a fourth embodiment of the present invention. FIG. 9 is a flow chart for indicating operation of an invalidating device, and FIG. 10 is an explanatory diagram for explaining a variation in distance data acquired by performing the laser beam scanning operation by a predetermined number within a certain calculation angle region. In this case, the operation of the invalidating device 31 is different from that shown in the flow chart of FIG. 7. In FIG. 10, an abscissa indicates a time "t" (t=1, 2, 3, ... ) of the scanning operation, and a symbol "T" represents a period (time defined between present distance data calculation and subsequent distance data calculation within a certain calculation angle region Ak) of the scanning operation. An ordinate represents a temporal change in distance data DDk(t) in a certain calculation angle region Ak, namely values of the distance data DDk(t) (t=1, 2, 3, ... ), a circular symbol is distance data calculated every scanning operation.

Within the measurement angle region of 15 degrees, when the scanning operation is carried out 1000 times at 0.1 [ms] with one step of 0.015 degrees, one scanning time becomes 100 [ms]. The distance data DDk(t) (t=1, 2, 3, ... ) in the same calculated angle range Ak (k=1, 2, 3, ... ) are acquired every 100 [ms]. As shown in FIG. 10, there are some possibilities that such distance data DDk(3) and DDk(7) having a large temporal change as values "P" and "Q" are acquired. A judgment is made as to whether or not the values "P" and "Q" of this distance data are caused by errors in the distance measurement by considering the data Mk(t) of the number "m" of the detection time of the detection data Dn(t) which constitutes the calculation basis of the distance data DDk(t) obtained in this calculation angle region.

Referring now to the flow chart of FIG. 9, the operations will be described. At a step S31, 1 is added to the number "t" of scanning times. At a step S32, a check is done as to whether or not an absolute value of a difference between the distance data DDk(t) acquired during the present scanning operation and the distance data DDk(t−1) acquired during the preceding scanning operation exceeds a preselected period C2. When this absolute value exceeds the value C2, another check is done at a step S33 as to whether or not the data Mk(t) about the detection number (m) of the original detection data Dn(t) is smaller than another predetermined value C3, which is basically used to calculate this distance data. At this step S33, if the data Mk(t) is smaller than this predetermined value C3, then the acquired distance data DDk(t) owns low reliability, this distance data DDk(t) is invalidated at a step S34.

At the step S33, when the data Mk(t) is higher than, or equal to this preselected value C3, it is so judged that the distance data DD(t) owns high reliability, because this distance data DDk(t) is greatly changed from the previously acquired distance data DDk(t−1), and is calculated based on the detection data Dn(t) detected more than a predetermined time C3. Therefore, this distance data DDk(t) is validated at a step S35. When it is so judged at the step S32 that the absolute value of the difference between the presently acquired distance data DDk(t) and the previously acquired distance data DDk(t−1) is smaller than a predetermined value C2, since the data change is small, this distance data owns the sufficiently high reliability. At the step S35, this distance data DDk(t) is validated. At a step S36, a check is done as to whether or not a stop signal is present. If there is no such a stop signal, then the process operation is returned to the step S31. Conversely, when interruption of the stop signal is made, this process operation is complete. As a consequence, only the stable distance data DDk(t) can be extracted.

The above-described operation is carried out in real time over k=1 to 100, namely overall scanning angle range of 15 degrees.

It should be understood that the judgment is made by employing a standard deviation instead of the data Mk(t) about the number "m" of the detected data at the step S33 of FIG. 9.

As previously explained, in accordance with the fourth embodiment of the present invention, when the absolute value of the change in the values of the distance data acquired by performing the scanning operations by a preselected number within a certain calculation angle region is larger than the predetermined value, and also the detection number of the detection data Dn(t) used to calculate this distance data DDk(t) is smaller than a predetermined number, it is recognized that this distance data DDk(t) contains the large error and the low reliability. Therefore, this data is invalidated, so that such distance data having the low reliability can be eliminated.

FIFTH EMBODIMENT

Figure 11:
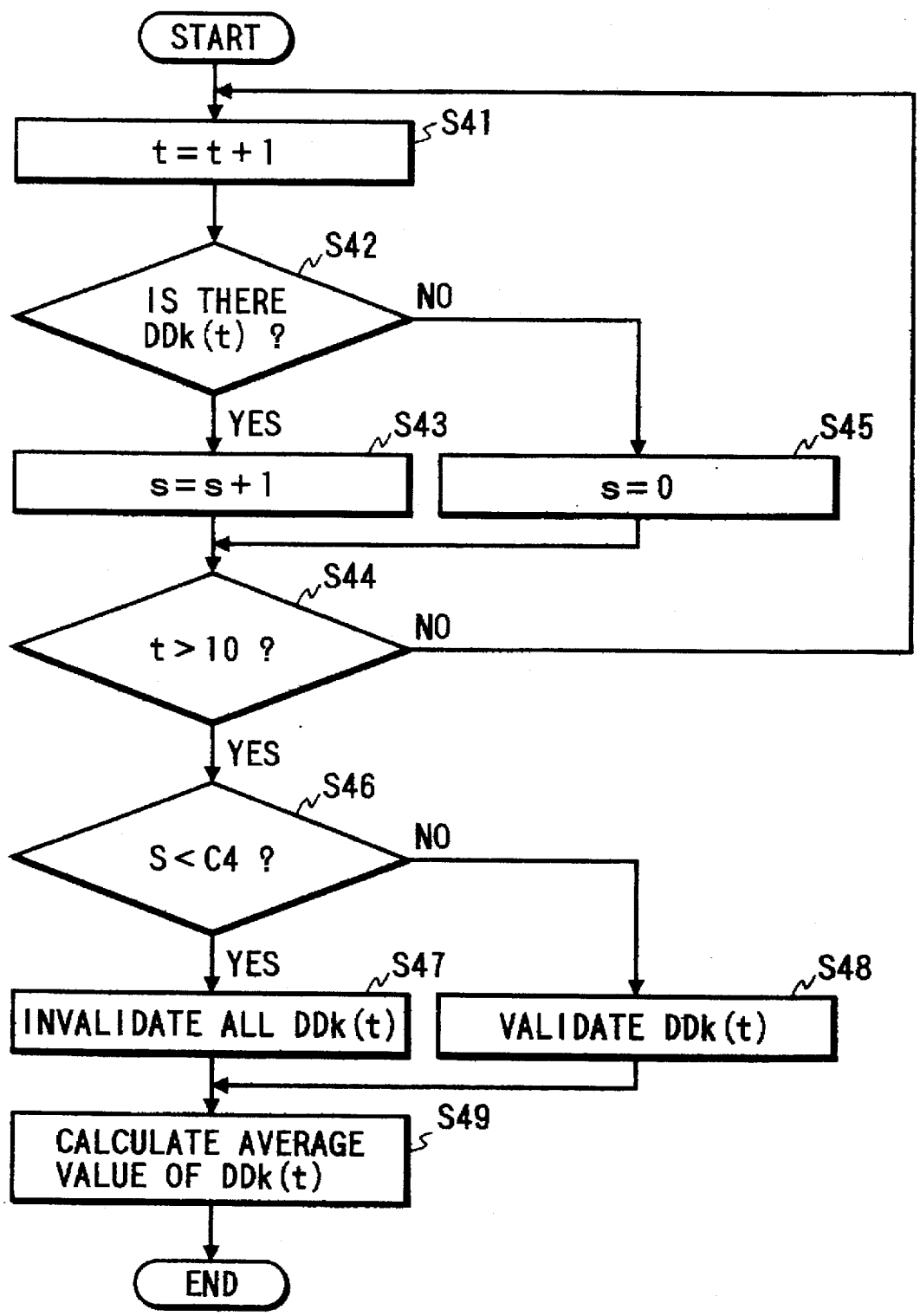
FIG. 11 is a flow chart for explaining operations of an invalidating device according to another embodiment of the present invention.

FIG. 11 is a flow chart for explaining operations of an invalidating device according to a fifth embodiment of the present invention. There are some possibilities that such distance data would cause distance data containing a large error, since the intensity of the pulse light reflected from the object becomes insufficient. This distance data is detected under such a critical judging condition as to whether or not the distance up to the object could be detected. The invalidating device according to this fifth embodiment of the present invention aims to improve the above-described point.

Similar to the above-explained fourth embodiment, in this case, it is also assumed that distance data acquired from a certain calculation angle region Ak by scanning a predetermined scanning angle range plural times are DDk(t) (t=1, 2,3, ... ), and such distance data acquired by scanning a preselected scanning angle range 10 times within a certain calculated region Ak are to be processed. In FIG. 11, 1 is added to the time "t" at a step S41. At a step S42, a check is done as to whether or not the calculation of the DDk(t) is required, namely, whether or not the distance data DDk(t) is present. If there is the distance data, then the count value "s" of the counter for counting the number at which the distance data is continuously obtained at a step S43 is counted up by 1. At the step S42, if there is no distance data, then the count value "s" is reset to 0 at a step S45.

Furthermore, when the number of scanning operation is smaller than 10 at a step S44, the process operation is returned to the step S41. At a step S46, a judgment is made as to whether or not the count value "s" of the counter is smaller than a predetermined value C4. If the count value "s" is smaller than a predetermined value C4, then the process operation is advanced to a step S47. At this step S47, it is recognized that reliability of the distance data DDk(t) is low, and then all of the distance data DDk acquired by scanning the relevant calculation angle region 10 times are invalidated.

At step S46, when the count value "s" of the counter is larger than, or equal to a preselected value C4, since the distance data DDk(t) are continuously obtained more than 4 times, reliability thereof is high, and the process operation is advanced to a step S48. At this step S48, the distance data DDk(t) are stored as valid distance data. Also, an average value of the distance data DDk(t) obtained at a step S49 is calculated.

If "t" exceeds 10 at the step S44, then the judgment of the coefficient value "s" of the counter has been carried out at the step S46. That is, also in this fifth embodiment, the judgment is made as to the distance data acquired by performing the scanning operations 10 times. As a consequence, the stable distance data DDk can be extracted.

It should be noted that the above-described operation is performed with respect to k=1 to 100, namely all of the calculation angle regions.

As a consequence, it is possible to eliminate such distance data containing a large error, which is detected under such a critical condition as to whether or not the object can be detected.

As previously explained, according to the fifth embodiment of the present invention, when the times at which the distance data are continuously acquired by scanning a certain calculation angle region by a preselected scanning time are smaller than a predetermined number, since the acquired distance data contain the errors, these distance data are invalidated. As a result, it is possible to remove such distance data possibly containing large errors.

SIXTH EMBODIMENT

Figure 12:
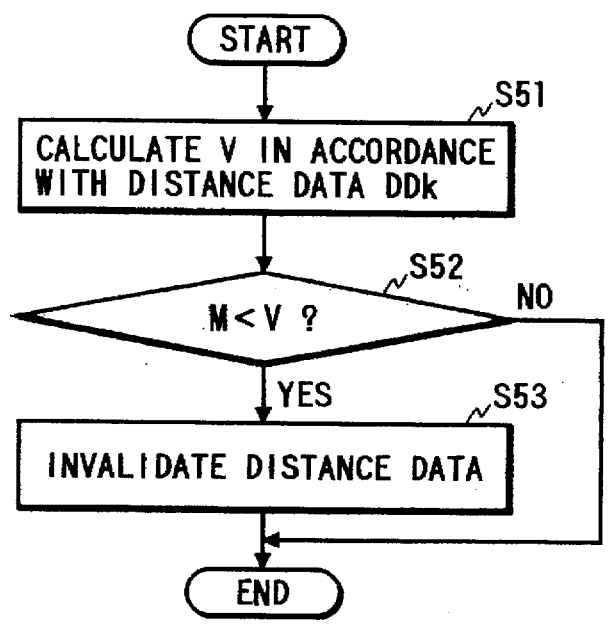
FIG. 12 is a flow chart for explaining operations of an invalidating device according to a further embodiment of the present invention.
Figure 13:
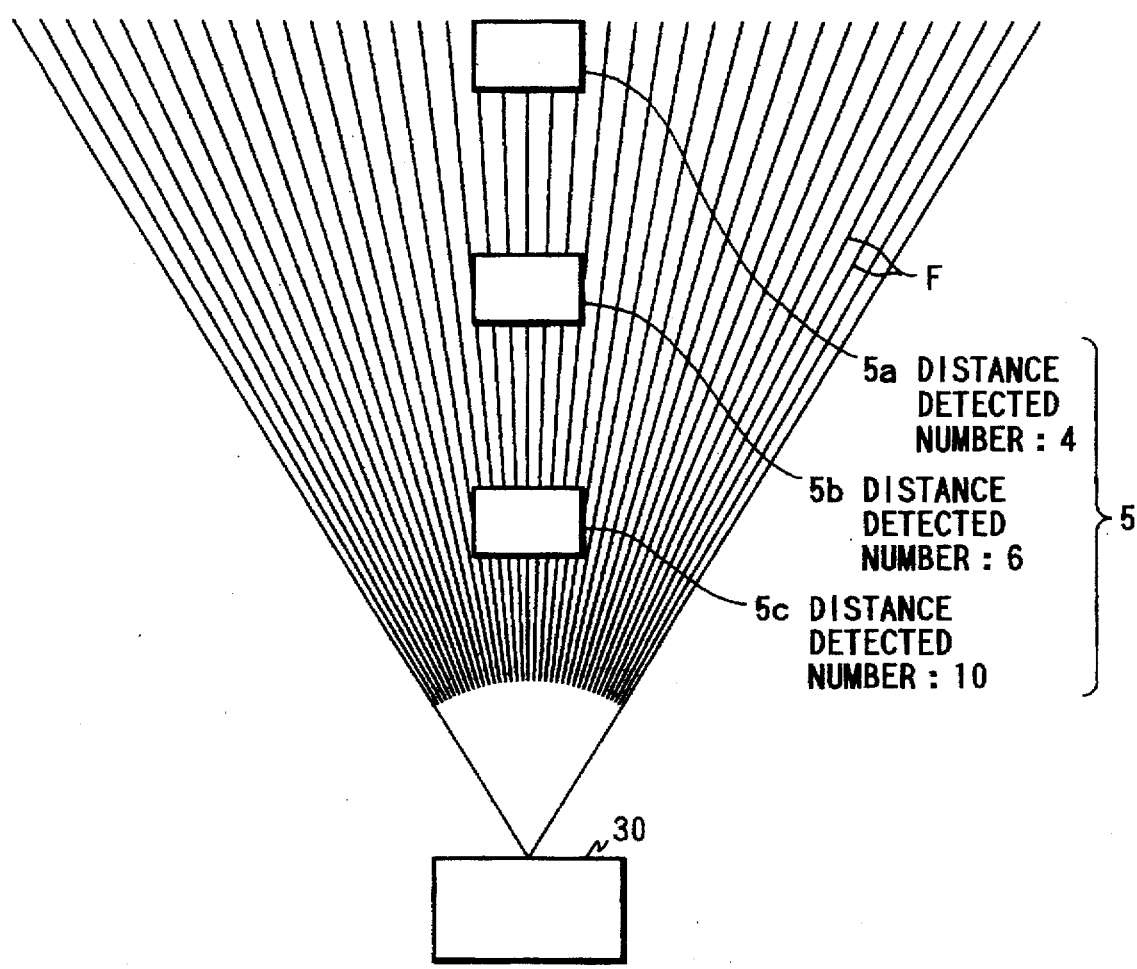
FIG. 13 is an explanatory diagram for explaining conditions of distance detections carried out in the invalidating device of FIG. 12.
Figure 14:
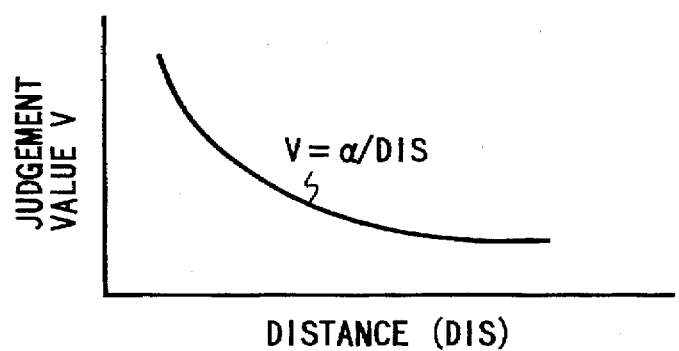
FIG. 14 is a characteristic diagram for representing a judging condition of the invalidating device shown in FIG. 12.

FIG. 12 to FIG. 16 represent a further embodiment of the present invention. That is, FIG. 12 is a flow chart for indicating operations of an invalidating device according to a sixth embodiment of the present embodiment. FIG. 13 is an explanatory diagram for explaining a distance detecting condition. FIG. 14 is a characteristic diagram for representing a judging condition. In this sixth embodiment, the operation of this invalidating device as indicated in the flow chart of FIG. 12 is different from the above-described operation of the invalidating device 31 shown in FIG. 6.

In FIG. 13, while a distance between an object 5 and a distance measuring apparatus 30 approaches objects 5a, 5b, and 5c, the detection number "m" of this distance (namely, quantity of detection data) is increased. As a consequence, although the calculated distance data DDk is a near distance, when the distance detection number "m" within this calculation angle region is small, it is conceivable that the laser beam F impinges only a portion of the object. Thus, when a relationship between the detection number "m" of the detection data and the distance of the calculated distance data DDk does not satisfy a preselected condition, this distance data DDk is invalidated by the invalidating device 31, so that distance data with low reliability may be removed.

Referring now to the flow chart of FIG. 12, the operations of the invalidating device 31 will be described in detail. At a step S51 of this flow chart, a judgment value V is read out in response to a value DIS (distance) of the calculated distance data DDk. As indicated in FIG. 14, a relationship between the value DIS of the distance data DDk and the judgment value V is set to V=α×(DIS), where symbol "α" indicates a coefficient, and symbol "DIS" represents a value of distance data. This relation formula is made as a table and is previously stored in the invalidating device 31.

When the detection number "m" at which the distance could be detected in a certain calculation angle region Ak is less than the judgment value "V", the detection number "m" is less, as compared with the detected distance. Then, it is judged that reliability is low. At a step S53, the distance data DDk calculated based upon this detection data Dn is invalidated. Conversely, if the detection number "m" is greater than the judgment value V, then it is judged that the resultant data directly corresponds to the effective distance data. Both of the distance data DDk and the data Mk about the detection member are supplied from the distance calculating device 23 and the data processing device 25 indicated in FIG. 1 in real time to the invalidating device 1, and then the invalidating device 31 performs the above-described operations for each of the calculation angle regions Ak.

As previously explained, in accordance with the sixth mode of the present invention, when the detection number of the detected data is less than the number defined based upon the distance of the calculated distance data, this calculated distance data is invalidated by the invalidating device 31. As a consequence, it is possible to eliminate such distance data possibly containing the large error.

SEVENTH EMBODIMENT

Figure 15:
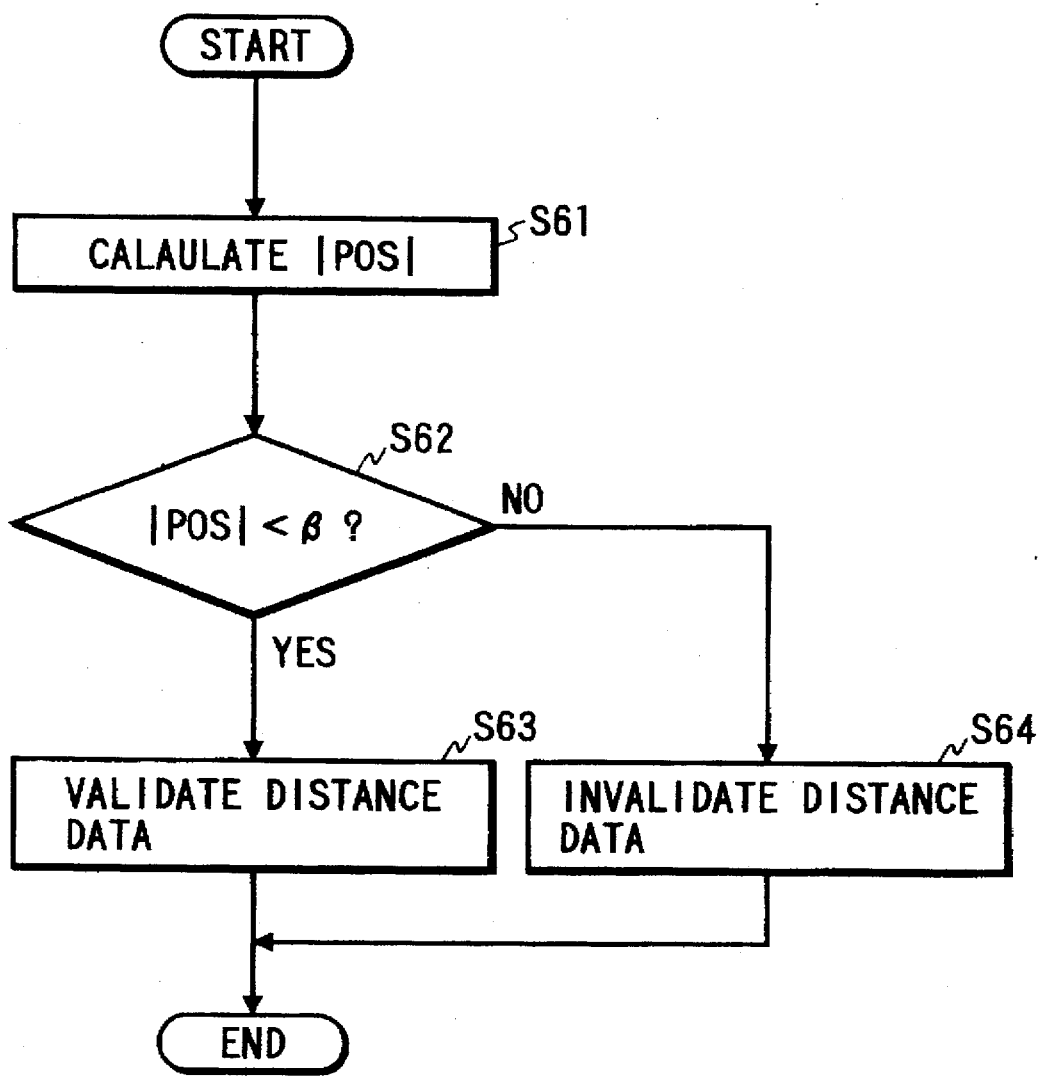
FIG. 15 is a flow chart for indicating operations of another distance measuring apparatus according to another embodiment of the present invention.

FIG. 15 is a flow chart for indicating operations of a distance measuring apparatus according to a seventh embodiment of the present invention. As shown in the previous FIG. 5, when the distance measuring apparatus 10 performs the scanning operation along one direction SD and detects the distance data for the respective calculation angle region, either in the calculation angle region A1, or the calculation angle region A3, where the laser beam F impinges only a portion of the object, the positions of the reflection pulse light detectable in this calculation angle region are eccentrically present in the left side of the calculation angle region A1, or in the right side of the calculation angle region A3. On the other hand, in the case that the laser beam F impinges at the entire object in a certain calculation angle region such as the calculation angle region A2 of FIG. 5, an average value of the detected positions of the reflection pulse light in this calculation angle region is located near the central position.

Thus, in accordance with the seventh mode of the present invention, an invalidating device 31 may judge as to whether or not a detection position of a distance in a certain calculated angle position region is eccentrically present along the scanning direction. Then, when this distance detection position is eccentrically present, it is recognized that the laser beam impinges only on an object, and therefore this distance data is invalidated by the invalidating device 31. As a consequence, it is possible to remove such distance data possibly containing an error.

The operations of the invalidating device 31 in this case will now be described with reference to the flow chart of FIG. 15. At a step S61, a formula representative of an eccentric dimension of data detected in the relevant calculation angle region is calculated, for example, a value of the below-mentioned equation is calculated:

$$|POS|=|(-5 \times FT1-4 \times FT2-3 \times FT3-2 \times FT4-1 \times FT5+1 \times FT6+2 \times FT7+3 \times FT8+4 \times FT9+5 \times FT10) \times \Delta\theta.$$

In this equation, the calculation angle region $\Delta\theta=0.015$, and symbol FTn (n=1 to 10) indicates such a coefficient which becomes 1 when the distances could be detected during 10 distance measuring operations in this calculation angle region, and becomes 0 when the distances could not be detected.

At a step S62, a check is done as to whether or not the calculated value of |POS| is smaller than a predetermined value "β". If the calculated value is smaller than a predetermined value "β", then this distance data is validated at a step S63. If the calculated value is larger than, or equal to a predetermined value "β", this distance data is invalidated at a step S64. A preselected value "β" in the judgment formula |POS|<β at the step S62 is set to a value corresponding to +0.045 degrees and −0.045 degrees. These angles are equal to an angle of 60% of a center portion in the calculate angle region (0.15). In this manner, when the detection position of the detection data Dn in a certain calculation angle region is deviated from more than a predetermined value, the distance data in this relevant calculation angle region is made invalidated, so that such distance data possibly containing a large error can be eliminated.

EIGHTH EMBODIMENT

Figure 16:
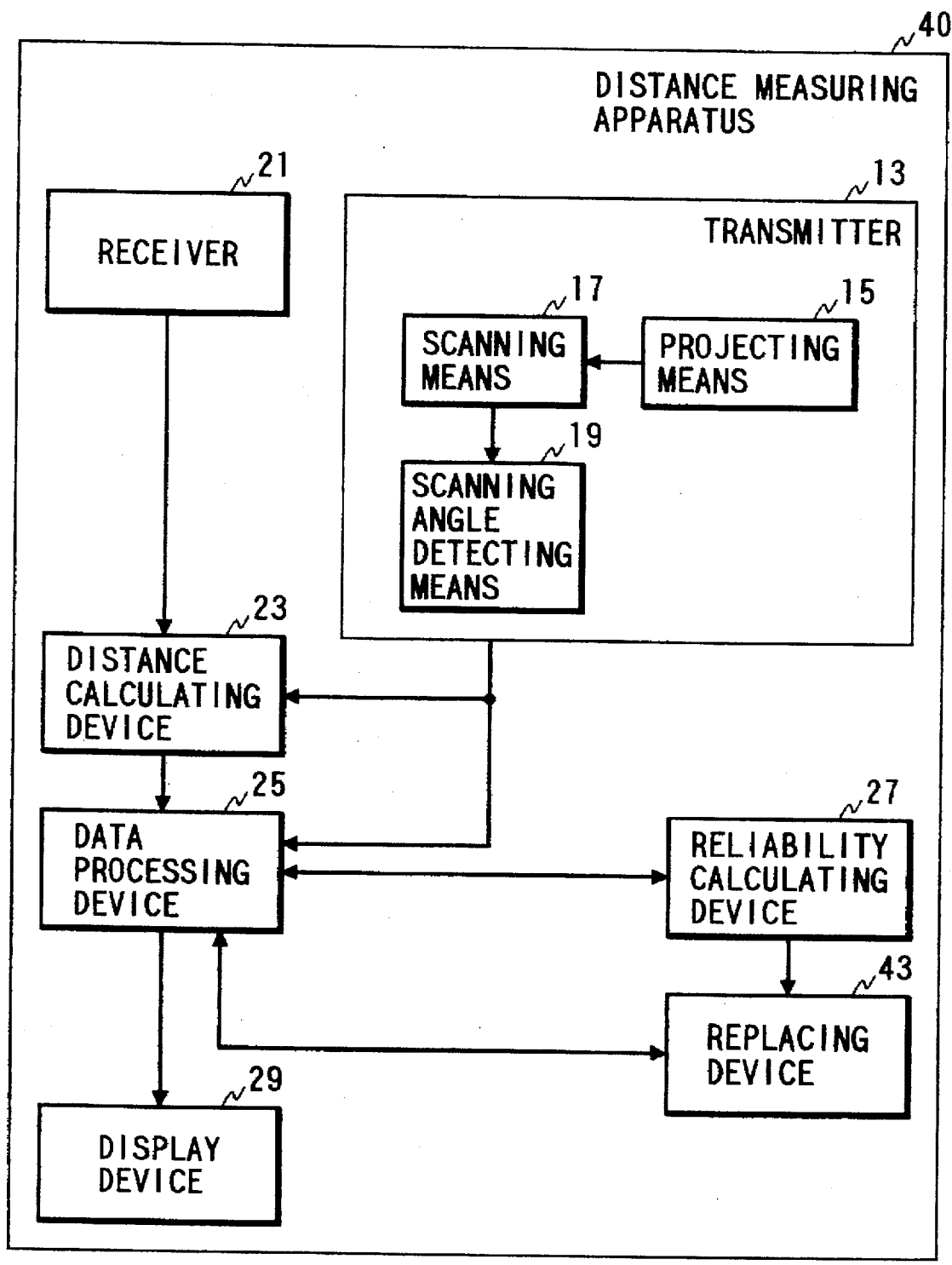
FIG. 16 is a schematic block diagram for representing an arrangement of a distance measuring apparatus according to a further embodiment of the present invention.
Figure 17:
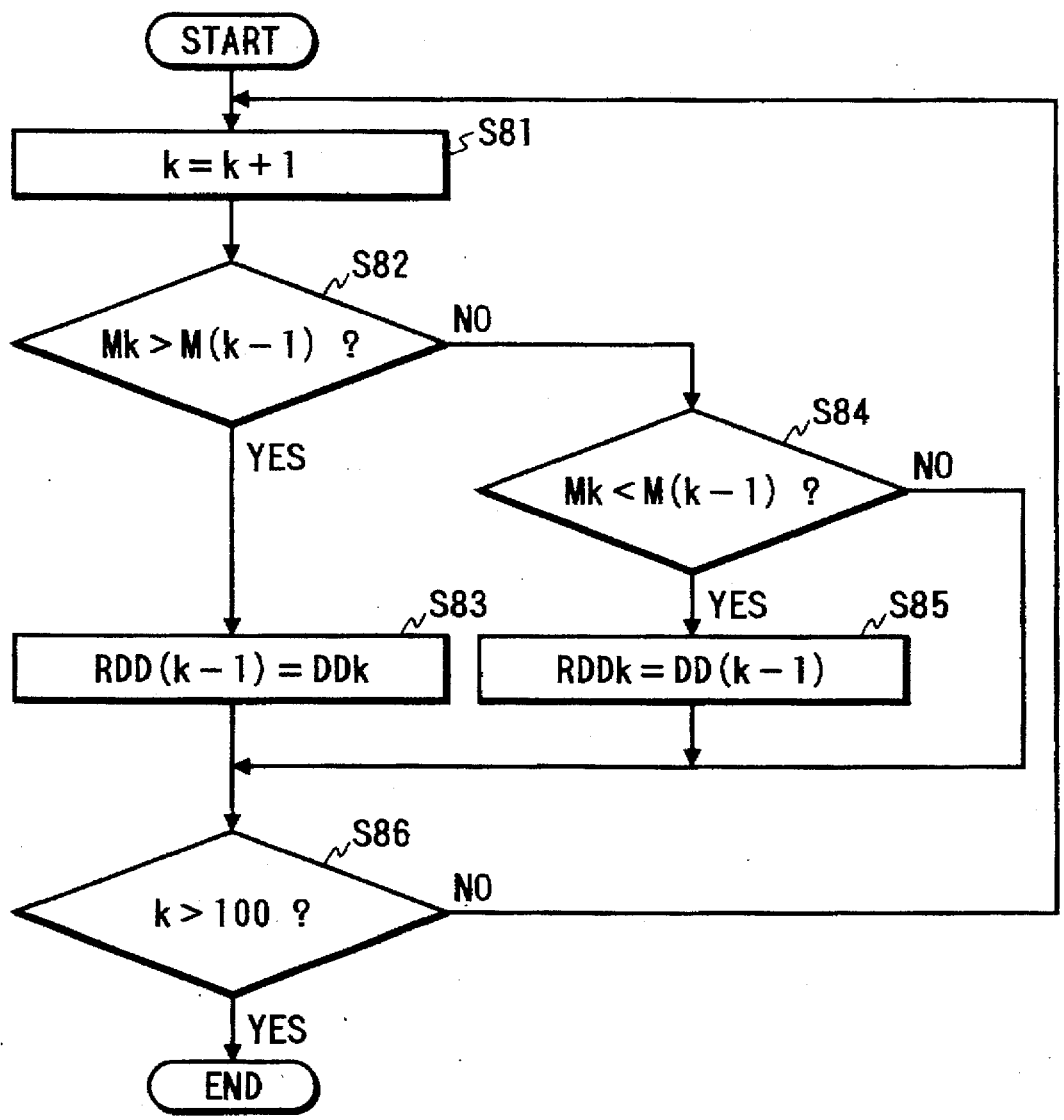
FIG. 17 is a flow chart for indicating operations of the distance measuring apparatus shown in FIG. 16.

FIG. 16 and FIG. 17 schematically indicate a distance measuring apparatus according to an eighth embodiment of the present invention. FIG. 16 is a block diagram of an arrangement of this distance measuring apparatus, and FIG. 17 is a flow chart for representing operations of a replacing device employed in this distance measuring apparatus. In these drawings, reference numeral 43 indicates a replacing device. Other structures of this distance measuring apparatus are similar to those shown in FIG. 1 and FIG. 2.

In the above-described embodiments 2 to 6, since the distance data having lower reliability is invalidated, the distance data possibly containing the large error is removed. To the contrary, in this eighth mode, a similar effect may be achieved by replacing distance data possibly containing a large error by such distance data acquired from an adjoining calculation angle region in which a large number of distance detections could be made. For example, as represented in FIG. 5, the distance detection numbers "m" in the calculation angle regions A1 and A3 are smaller, as compared with that of the calculation angle region A2. In other words, it is conceivable that reliability R of the distance data acquired from the calculation angle regions A1 and A3 is low.

Thus, the replacing device 43 is employed and is operated in a manner as represented in the flow chart of FIG. 17. That is, at a step S82, data M(k−1) and Mk are detection numbers in two calculation angle regions A(k−1) and 20 Ak, (corresponding to first and second calculation angle regions adjacent to each other). When the detection number data Mk is greater than the detection number data M(k−1), distance data RDD(k−1) to be outputted is replaced by the distance data DDk at a step S83.

At a step S84, when the detection number data Mk is smaller than the detection number data M(k−1), it is recognized that the distance data DD(k−1) owns higher reliability than that of the distance data DDk. Thus, the distance data RDDk to be outputted is replaced by the distance data DD(k−1) at a step S85. If the detection time data Mk is equal to the detection time data M(k−1), then no distance data replacement is carried out.

It should be understood that a register for storing the distance data RDDk (k=1 to 100) to be outputted is separately employed in order not to replace the contents of the distance data.

The above-described operation is repeated 100 times at a step S86. When the comparisons of the detection number Mk in all of the calculation angle regions A1 to A100 are complete, a series of this operation is ended (step S86).

By carrying out the above-described operations, assuming now that, for instance, a series [1, 2, 3, 4, 5, 6, 7, . . . ] of calculation angle region Ak correspond to a series [4, 10, 3, 1, 7, 10, 3, ...] of data Mk about the detection number "m" (unit of "number") and a series [15, 14, 15, 25, 16, 14, 19, ...] of distance data DDk (unit [m]:meter), a series of replaced distance data RDDk to be outputted is given as [14, 14, 14, 16, 14, 14, 14, ...]. As a consequence, the distance data are replaced by the distance data corresponding to the detection numbers 10 (k=2), 7 (k=5), and 10 (k=6). In this case, either the calculation angle region A(k−1), or Ak to be replaced corresponds to the first calculation angle region according to the present invention, whereas either the calculation angle region Ak, or A(k−1) to be replaced corresponds to the second calculation angle region according to the present invention.

It should also be noted that the above-described steps S82 and S83 are omitted, and only when the data Mk about the detection number is smaller than the data M(k−1) about the detection number at the steps S84 and S85, a data replacement may be carried out. In this modification, a series of the above-explained replaced distance data to be outputted is given to [15, 14, 15, 16, 14, 14, ...]. In this case, the calculation angle region Ak to be replaced corresponds to the first calculation angle region, whereas the calculation angle region A(k−1) to be replaced corresponds to the second calculation angle region in the present invention.

As described above, for instance, the distance data acquired in the calculation angle regions A1 and A3 are replaced by the distance data acquired in the calculation angle region A2, so that such a distance data possibly containing a large error can be eliminated, which is produced when the laser beam impinges only on a portion of the object.

NINTH EMBODIMENT

Figure 18:
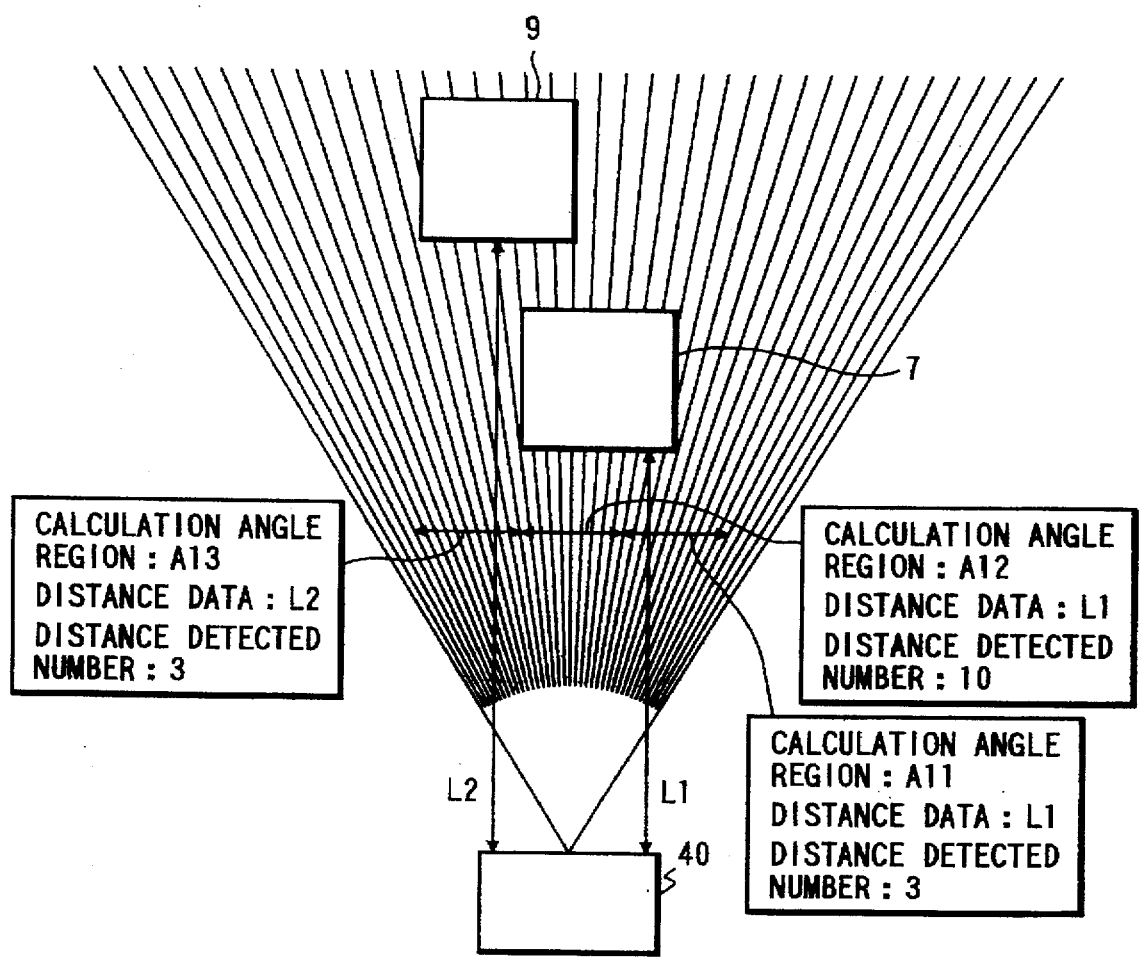
FIG. 18 is an explanatory diagram for explaining detection conditions achieved by scanning the laser beam.
Figure 19:
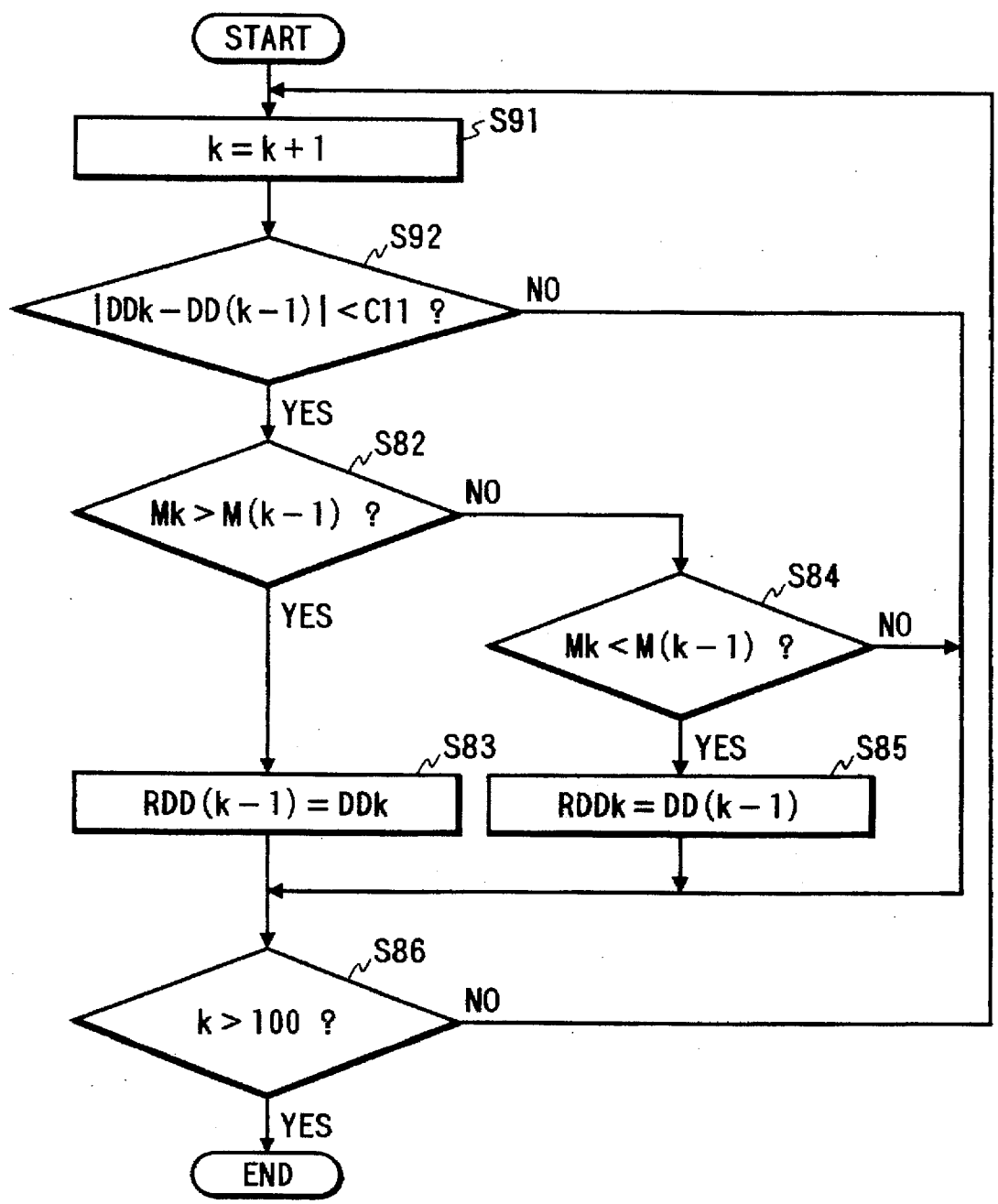
FIG. 19 is a flow chart for showing operations of the invalidating device of FIG. 18.

FIG. 18 and FIG. 19 show a distance measuring apparatus according ninth embodiment of the present invention. FIG. 18 is an explanatory diagram for explaining a detection condition by a laser beam scanning operation, and FIG. 19 is a flow chart for explaining operations of an invalidating device 33. This ninth embodiment is achieved by improving the eighth embodiment of FIG. 17 the invalidating device in this ninth embodiment is realized by changing the control program used in the invalidating device 31.

In FIG. 18, there are two objects, namely an object 7 positioned apart from a distance measuring apparatus 40 by a distance L1, and an object 9 positioned apart from this distance measuring apparatus 40 by a distance L2. When these objects 7 and 9 are positioned adjacent to each other as to a viewing angle, as viewed from the distance measuring apparatus 40. With respect to the distance data about the calculation angle region A11, the data detected number at the distance L1 becomes 3. As to the distance data about the calculation angle region A12, the data detected number at the distance L1 becomes 10. Also, as to the distance data about the calculation angle region A13, the data detected number at the distance L2 becomes 3.

Here, in the previous embodiments of the present invention shown in FIG. 7 and FIG. 17, the distance data DD11 and DD13 of the calculation angle regions A11 and A13 where the distance detected numbers "m" are small are invalidated, or replaced by other distance data irrelevant to the measured distance. Then, the distance data in this calculation angle region is not outputted, but is removed. However, the distance data DD13 of the calculation angle region A13 is caused by the laser beam reflections from the object 9, but by the laser beam reflections from a portion of the object 7. Accordingly, although the different object is sensed, the distance data derived from this sensed object would be removed. In accordance with this ninth embodiment, this difficulty may be solve.

Referring now to a flow chart shown in FIG. 19, operations of the ninth embodiment will be explained. At a step S91, 1 is added to a calculation number "k" of the distance data DDk. At the next step S92, when an absolute value of a difference between the distance data (DDk−DD(k−1)) of the two adjoining calculation angle regions Ak and A(k−1) is smaller than a predetermined value C11, it is recognized that the same object is sensed. As a result, the process operation is advanced from a step S82 to a step S83, or to steps S84 and S85, at which the content of the distance data DD(k−1) to be outputted is replaced by the value of the distance data DDk, otherwise the content of the distance data RDDk to be outputted is replaced by the value of the distance data DD(k−1). It should be noted that when the detected numbers are identical to each other (Mk=M(k−1)), no data replacement is carried out.

In the case that the absolute value of the difference between the distance data (DDk−DD(k−1)) is larger than a predetermined value C11 at the step S92, the distance data are not replaced but the process operation is advanced to a step S86. Accordingly, when the objects 7 and 9 are present, as indicated in FIG. 18, within the calculation angle regions A11 and A12 where the same object 7 is detected, the content of the distance data RDD11 to be outputted, acquired from the calculation angle region A12 corresponding to the first calculation angle region is replaced by the value of the distance data DD12 acquired from the calculation angle region A12 corresponding to the second calculation angle region. However, when an absolute value of the distance data difference (DDk−DD(k−1)) is larger than, or equal to a preselected value C11, it is recognized that the distance data DD13 of the calculation angle region A13 located adjacent to the calculation angle region A12 detects the different object, the content of this distance data RDD13 to be outputted is not replaced by the distance data DD12 of the calculation angle region A12.

As described above, a judgment is made as to whether or not an object detected from two calculation angle regions located adjacent to each other is an object located at the substantially same distances. When an absolute value of a difference in the distances is smaller than a preselected value, such data possibly containing a large error can be eliminated. In particular, the farther a laser beam is projected, the wider the laser beam is widened. Therefore, the farther an object is located from a distance measuring apparatus, the smaller the detected number of this distance becomes. As a consequence, in the example of FIG. 18, when this distance measuring apparatus is mounted on an owned vehicle so as to be utilized as a vehicle-to-vehicle distance sensor, the above-described condition may readily occur in the case that plural vehicles are driven in front of the owned vehicle on a curved road and the like. At this time, such distance data about the forward vehicle far from the owned vehicle should be acquired as quickly as possible, and this distance data should not be removed. According to this ninth embodiment, there is no risk to remove such distance data.

TENTH EMBODIMENT

Figure 20:
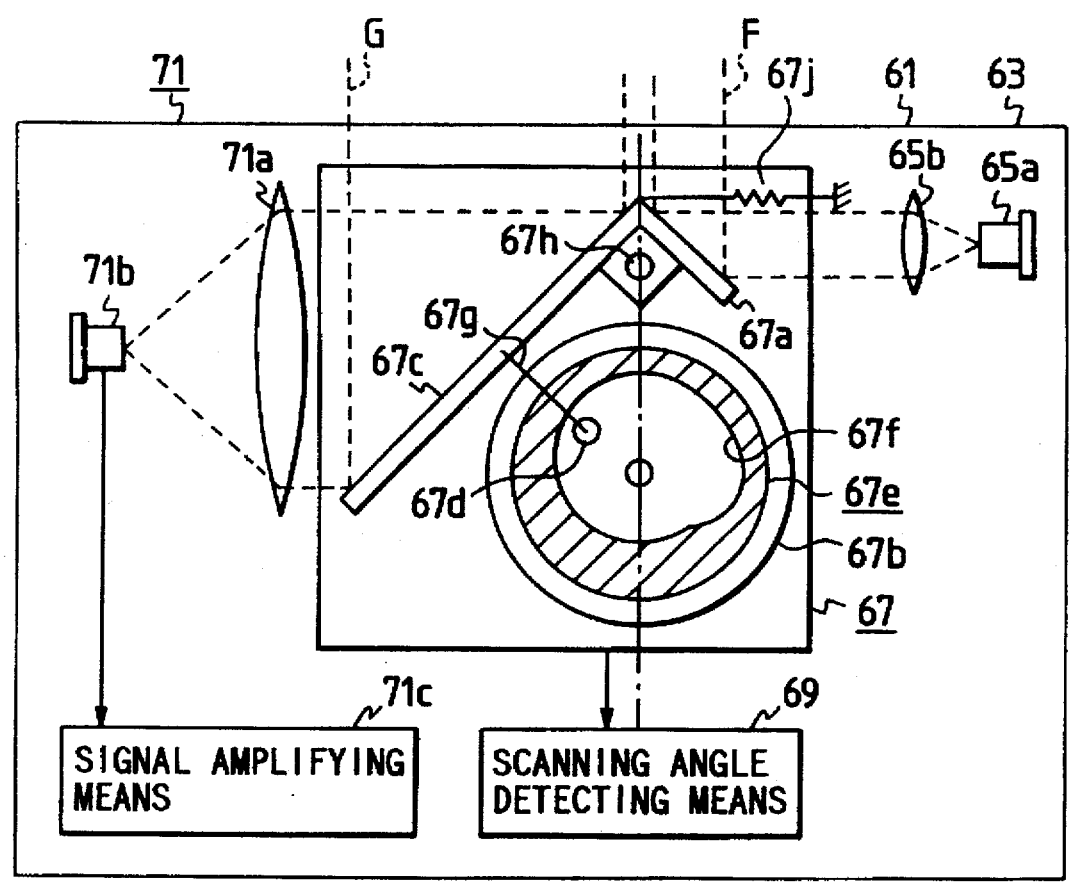
FIG. 20 schematically indicates an arrangement of a transmitter/receiver device according to a further embodiment of the present invention.

FIG. 20 is a schematic block diagram for representing a structure of a distance measuring apparatus according to a tenth embodiment of the present invention. In this drawing, reference numeral 61 shows a transmitter/receiver device, and is arranged by a transmitter 63 and a receiver 71. In accordance with this embodiment of the present invention, both of a transmitted laser beam and a received reflection beam are jointly scanned. The transmitter 63 includes projecting means 65 and scanning means 67.

The projecting means 65 is constructed in a similar manner to the above-described projecting means 15 as shown in FIG. 1. That is, the projecting means 65 contains a laser diode 65a and a light-feeding lens 65b. The laser diode 65a is positioned at a focal point of the light-feeding lens 65b. The laser diode 65a emits pulse laser light, and the light-feeding lens 15b collects the pulse laser light E projected from the laser diode 65a to produce such a laser beam F having a very narrow expanded angle of 0.05 degrees with respect to the scanning direction.

The scanning means 67 contains a light-feeding mirror 67a, a stepper motor 67b, a light receiving mirror 67c, a follower 67d, a cam 67e, a cam groove 67f, a connection rod 67g, a support pin 67h, and a coil spring 67j. A size of the light receiving mirror 67c is made approximately 4 times larger than that of the light-feeding mirror 67a so as to increase an amount of received light. The light-feeding mirror 67a and the light receiving mirror 67c are fixed to define a right angle between them, as illustrated in FIG. 20. The overall mirror structure is supported by the support pin 67h in such a manner that this mirror structure is pivotable along right/left directions.

The cam groove 67f having a heart shape is formed in a disk portion of the cam 67e, and is directly coupled to a drive shaft of the stepper motor 67b. FIG. 20 represents such a condition that the disk-shaped cam 67e is overlapped on the circular-shaped stepper motor 67b, and the heart-shaped cam groove 67f is formed in this cam 67e. For an easy understanding, this cam 67e is hatched. The follower 67d is depressed against the cam groove 67f by means of the coil spring 67j, and is moved along the cam groove 67f while the shaft of the stepper motor 67b is rotated. As a result, both of the light-feeding mirror 67a and the light receiving mirror 67c are swung via the connection rod 67g along the horizontal direction.

Reference numeral 69 denotes scanning angle detecting means so as to detect a swing angle "θ" of the light-feeding mirror 67a by the scanning means 67. The transmitter 63 is arranged in the above-described manner. It should be noted that the scanning means 67 and the scanning angle detecting means 69 are commonly used with the below-mentioned receiver 71.

The receiver 71 includes a light receiving lens 71a and a photodiode 71b located at a focal point of this light receiving lens 71a, and also a signal amplifying unit 71c. Then, the reflection pulse light G impinged on the object 3 reflected therefrom is collected by the light receiving lens 71a, and the collected reflection pulse light is received by the photodiode 71b so as to be converted into an electric signal. The electric signal is amplified by the signal amplifying unit 71c.

The structures of the distance measuring apparatus 23, data processing device 25, reliability calculating device 27, and display device 29 are similar to those of the first embodiment shown in FIG. 1.

Operations will now be explained. The laser light which has been emitted in a pulse form from the laser diode 65a and has been formed as the laser beam F with the extended angle of 0.05 degrees by the light-feeding lens 65b is reflected upwardly by the light-feeding mirror 67a, and transmitted toward the object. The laser beam F impinges on the object 3 and then reflected therefrom to become the reflection pulse light G. This reflection pulse G is reflected by the light receiving mirror 67c and then collected by the light receiving lens 71a. The collected laser light is converted into the electric signal by the photodiode 71b.

The light-receiving mirror 67a is swung by 0.0075 degrees by driving the stepper motor 67b by 1 step to scan the laser beam by a twice angle of 0.015 degrees along the horizontal direction. Thus, the scanning angle Δθ during one scanning operation becomes 0.015 degrees, and the scanning angle range is 15 degrees. Similar to the embodiment of FIG. 3, the laser beam F is transmitted 1000 times at 0.015 degree per step during one scanning operation. Then, the distance calculating device 23 calculates the distance every time the laser beam F is transmitted. The data processing device 25 calculates. The distance data under such a condition that the distance measurement is carried out 10 times and 0.15 degrees are defined as the calculation angle region. The operations of the reliability calculating device 27 and the display device 29 are similar to those of the embodiment shown in FIG. 1. Both of the distance data DDk and the reliability Rk, which are calculated with respect to the respective calculation angle regions Ak, are displayed on the display device 28.

In this embodiment, since the reflection pulse light G is scanned by the light receiving mirror 67c also at the receiving side and is continuously collected to the photodiode 71b, a large number of photodiodes are no longer arranged so as to collect the reflection pulse light. Therefore, the structure of the light receiving unit can be made simple and the sensitivity thereof can be increased.

ELEVENTH EMBODIMENT

Figure 21:
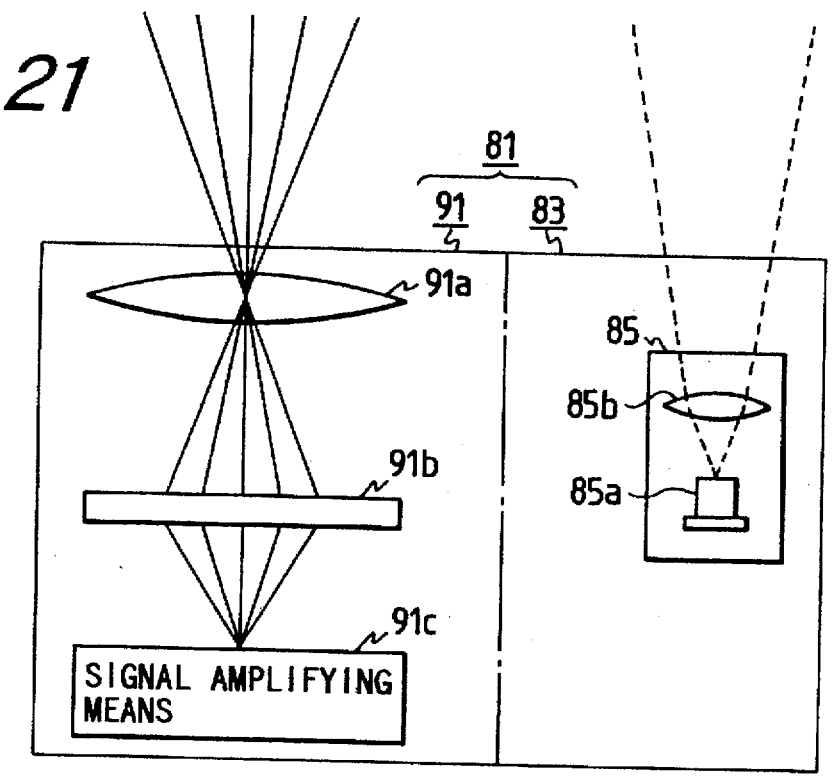
FIG. 21 schematically indicates an arrangement of a transmitter/receiver device according to a further embodiment of the present invention.

FIG. 21 is a schematic block diagram for representing a structure of a distance measuring apparatus according to an eleventh embodiment of the present invention. In this drawing, reference numeral 81 shows a transmitter/receiver device, and is arranged by a transmitter 83 and a receiver 91. The transmitter 83 owns projecting means 85. The projecting means 85 contains a laser diode 85a and a light-feeding lens 85b. The laser diode 85a is positioned at a focal point of the light-feeding lens 85b. The laser diode 85a emits pulse laser light, and the light-feeding lens 85b collects the pulse laser light E projected from the laser diode 85a to produce such a laser beam FF having an expanded angle of 15 degrees with respect to the scanning direction. Then, the laser beam FF is transmitted toward the scanning angle range A.

The receiver 91 contains a convex lens 91a, a PSD (position sensitive device) type light receiving element 91b located at the focal point of this convex lens 91a and subdivided into 1000 elements along the scanning direction, and a signal amplifying unit 92c. Then, the reflection pulse light GG impinged on the object 3 and reflected therefrom is collected by the convex lens 91a, and the collected reflection pulse light GG is focused onto the light receiving element 91b so as to be converted into an electric signal.

The laser light incident direction is detectable by switching the connections between the light receiving element 91b and the signal amplifying unit 91c. This connection switching can calculate the distances on the light receiving element 111b as to 1000 points corresponding to the scanning step of 0.015 degrees in the first embodiment of FIG. 1, while scanning the laser beam FF, by receiving the reflection pulse light GG and by amplifying the converted light signal. Then, when the distance can be obtained by the above-explained calculation, this calculated distance is assumed as detection data Dn. Under such conditions, both of the distance data DDk and the reliability Rk are calculated in a similar manner to the first embodiment of FIG. 1 based upon the calculation results for 10 points corresponding to the calculation angle region Ak.

TWELFTH EMBODIMENT

Figure 22:
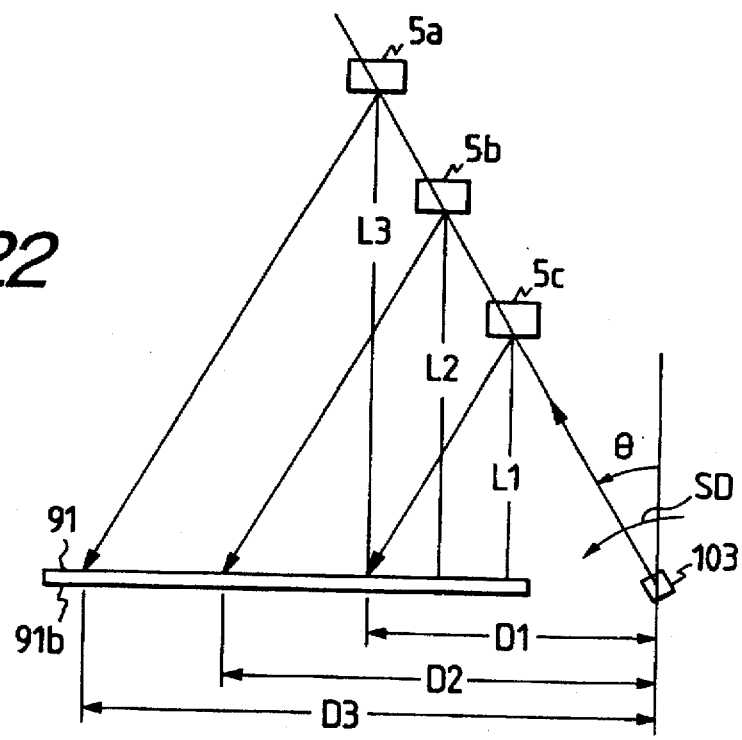
FIG. 22 is an explanatory diagram for explaining a basic operation idea of a distance measuring apparatus according to a still further embodiment of the present invention.

FIG. 22 is an explanatory diagram for explaining an operation principle of a distance measuring apparatus according to twelfth embodiment of the present invention. In this drawing, a transmitter/receiver device includes a transmitter 103 and a receiver 91. The transmitter 103 includes projecting means. Although not shown in detail, the projecting means includes a laser diode for emitting pulse light in an infrared ray range, and a convex lens. The pulse light emitted from the laser diode positioned on the focal position of the convex lens in formed as a light-feeding beam substantially parallel to the optical axis OA1 and the parallel laser beam is transmitted. Then, the scanning means 103 is driven by a drive device (not shown) by a step of 0.015 degrees along the scanning direction SD. The receiver 91 has a similar structure as that of the receiver 91 0.15 indicated in FIG. 21. The PSD type light receiving element 91b detects the light receiving position.

Based upon the triangulation method, assuming now that an interval along the horizontal direction from the transmitter 103 to the position of the reflection light received by the light receiving element 91b of the receiver is "D", a distance "L" measured up to the object may be calculated as L=(D/2 tanθ). That is, distances L1, L2, L3 up to the objects 5c, 5b, 5a may be calculated as D1/tanθ, D2/tanθ, D3/tanθ. This calculation is carried out by using a distance calculating device (not shown). Similar to the first embodiment of FIG. 1, as to 1000 points on the light receiving element 91b, both of the distance data and the reliability about the calculation angle region for every 10 calculations are calculated.

Although the entire transmitter has been scanned by the step of 0.015 degrees in the above-explained embodiment, the projecting means may be fixed and the laser beam may be scanned by the light-feeding mirror in a similar manner to that of the transmitter 13 shown in FIG. 2. At this time, the distance D along the horizontal direction and tanθ are converted into the corresponding values shown in FIG. 22, and then the distance L up to the object is calculated.

THIRTEENTH EMBODIMENT

Figure 23:
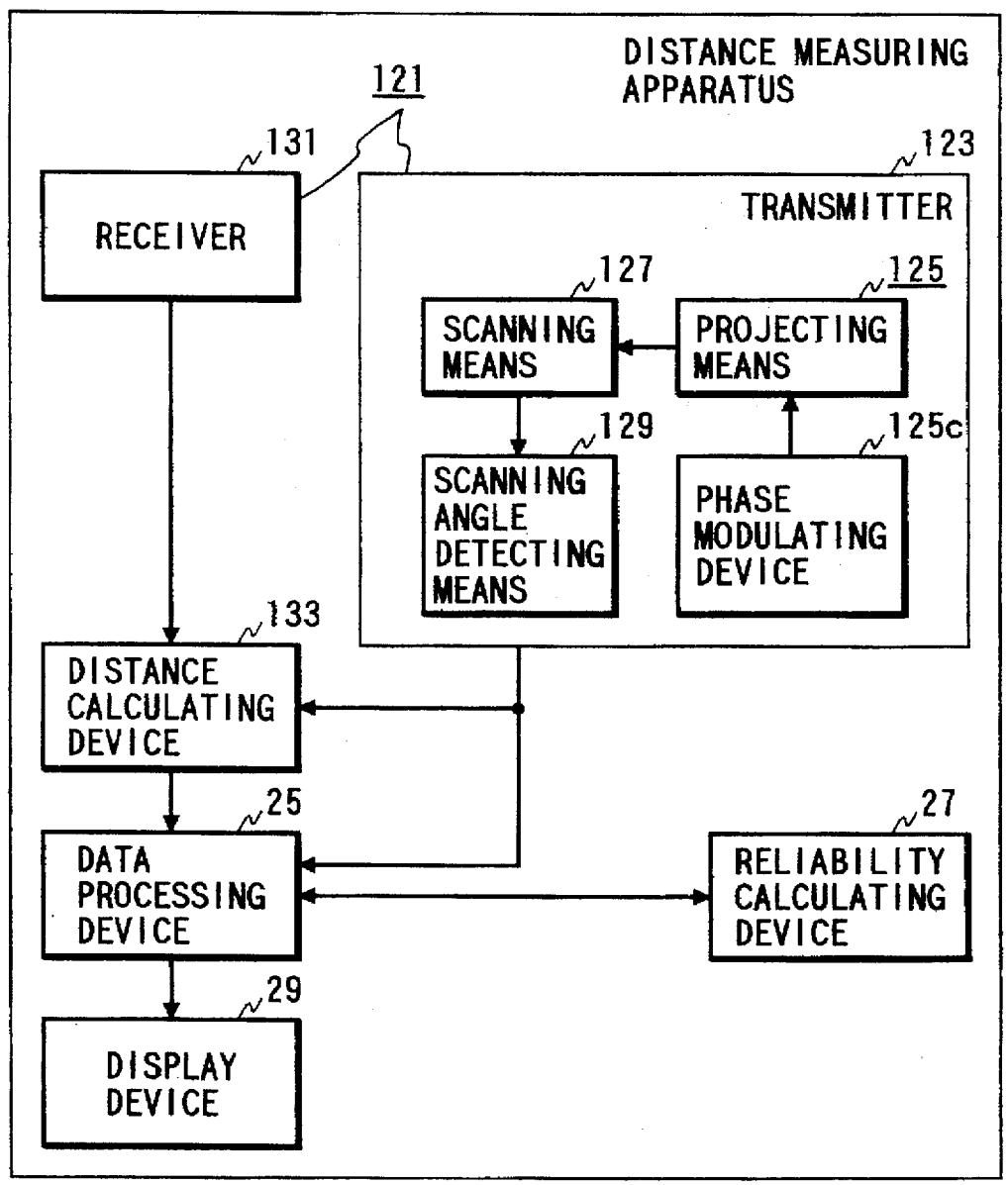
FIG. 23 is a schematic block diagram for showing an arrangement of the distance measuring apparatus indicated in FIG. 22.
Figure 24:
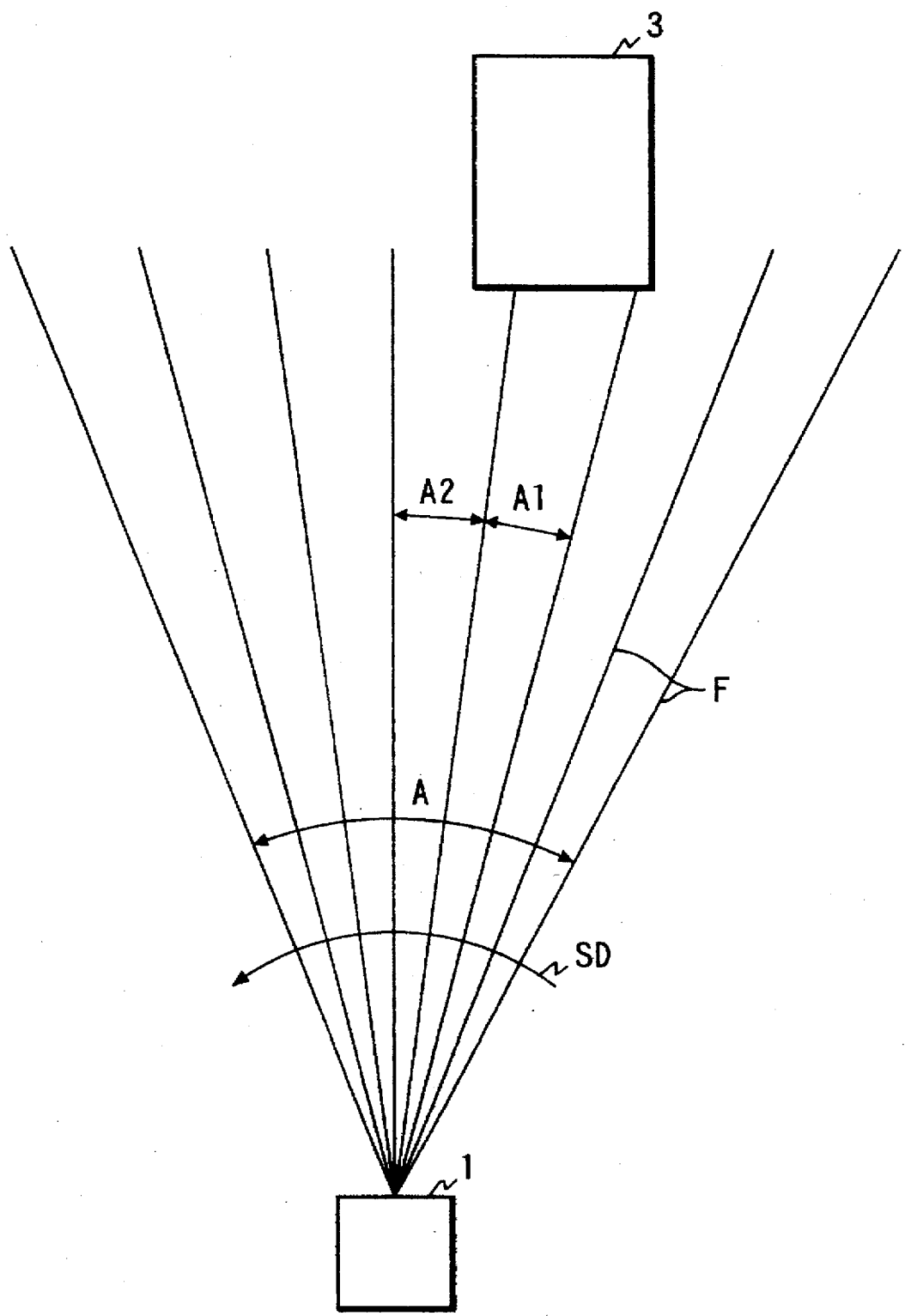
FIG. 24 is an explanatory diagram for explaining the problems of the prior art distance measuring apparatus.

FIG. 23 is a schematic block diagram for representing a structure of a distance measuring apparatus according to a thirteenth embodiment of the present invention. In this drawing, reference numeral 121 shows a transmitter/receiver device, and is arranged by a transmitter 123 and a receiver 131. The transmitter 123 includes projecting means 125, scanning means 17, and scanning angle detecting means 19. The projecting means 65 contains a laser diode, a light-feeding lens (not shown), and a phase modulator 125c. The laser diode emits pulse laser light, and the light-feeding lens collects the pulse laser light projected from the laser diode to produce such a laser beam having a very narrow expanded angle of 0.05 degrees with respect to the scanning direction. The phase modulator 125c modulates light intensity of the laser diode with a preselected modulating signal.

The receiver 131 receives such reflection light and converts this light into an electric signal. This reflection light is returned from the object 3 on which the modulation light emitted from the laser diode impinges. Reference numeral 133 shows a distance calculating device which calculates a distance up to the object 3 as detection data based upon a phase difference between modulation signals derived from the projected modulation light and the received reflection light.

Other structures of this distance measuring apparatus are similar to those shown in FIG. 1, and are indicated by the same reference numerals, explanations of which are omitted.

In the distance measuring apparatus with the above-described arrangement, the transmitter 123 transmits the modulation light every 1 step, i.e., 0.015 degrees of the scanning means 127. The light receiving device 131 receives the reflection light from the object. The distance calculating device 133 calculates the distance up to the object based on the phase difference between the both modulation/reflection light, thereby obtaining the detection data Dn. Furthermore, an average value of the detection data obtained from the calculation results for 10 times (0.15 degrees) is calculated to be used as the distance data DDk in this calculation angle region. Also, reliability of this distance data DDk may be obtained from the total number "m" of the resultant detection data in a similar manner to the first embodiment shown in FIG. 1.

OTHER MODIFICATIONS

Although the laser light emitted in the infrared ray range is used as the electromagnetic wave in the above-explained embodiments, visible light or other types of electromagnetic waves may be employed.

It is apparent that some of the above-described embodiments may be arbitrarily combined with each other.

It should also be noted that the above-described data processing device 25, reliability calculating device 27, invalidating device 31, and replacing device 43 employed in the various embodiments are a data process determining device according to the present invention.

What is claimed is:

1. A distance calculating apparatus comprising:

a transmitter/receiver device including at least one of a transmitter for projecting electromagnetic waves while scanning the electromagnetic waves, and a receiver for receiving reflection waves that are electromagnetic waves reflected from an object while scanning the reflection waves;

an angle detecting device for detecting at least one of an angle when said electromagnetic waves are projected and an angle when said reflection waves are received;

a distance calculating device for calculating a distance to the object corresponding to said angle based on time measured from the projection of the electromagnetic waves and the reception of the reflection waves, thereby using said calculated distance as detection data; and a data processing device for acquiring distance data in a calculation angle region corresponding to a plurality of said distance calculations based upon the detection data obtained during a plurality of distance calculations.

2. A distance calculating apparatus as claimed in claim 1, further comprising:

a reliability calculating apparatus for calculating reliability of the distance data in a relevant calculation angle region based on the detection data within said relevant calculation angle region.

3. A distance calculating apparatus comprising:

a transmitter/receiver device including at least one of a transmitter for projecting electromagnetic waves while scanning the electromagnetic waves, and a receiver for receiving reflection waves that are electromagnetic waves reflected from an object while scanning the reflection waves, wherein the transmitter modulates the projected electromagnetic waves with a predetermined modulation signal to thereby project modulated electromagnetic waves;

an angle detecting device for detecting at least one of an angle when said electromagnetic waves are projected and an angle when said reflection waves are received;

a distance calculating apparatus for calculating a distance to the object corresponding to said angle based upon a phase difference in the modulation of the projected electromagnetic waves and the received reflection waves, thereby using the calculated distance as detection data; and a data processing device for acquiring distance data in a calculation angle region corresponding to a plurality of said distance calculations based upon the detection data obtained during a plurality of distance calculations.

4. A distance calculating apparatus comprising:

a transmitter/receiver device including at least one of a transmitter for projecting electromagnetic waves while scanning the electromagnetic waves, and a receiver for receiving reflection waves that are electromagnetic waves reflected from an object while scanning the reflection waves;

an angle detecting device for detecting at least one of an angle when said electromagnetic waves are projected and an angle when said reflection waves are received:

a distance calculating device for calculating a distance to said object corresponding to said angle based upon a relationship between said electromagnetic waves and said reflection waves, thereby using the calculated distance as detection data;

a data processing device for acquiring distance data in a calculation angle region corresponding to a plurality of said distance calculations based upon the detection data obtained during a plurality of distance calculations; and a data process determining apparatus for determining a process of the distance data based on at least one of the detection data and the distance data within the calculation angle region.

5. A distance calculating apparatus comprising:

a transmitter/receiver device including at least one of a transmitter for projecting electromagnetic waves while scanning the electromagnetic waves, and a receiver for receiving reflection waves that are electromagnetic waves reflected from an object while scanning the reflection waves;

an angle detecting device for detecting at least one of an angle when said electromagnetic waves are projected and an angle when said reflection waves are received;

a distance calculating device for calculating a distance to said object corresponding to said angle based upon a relationship between said electromagnetic waves and said reflection waves, and for using a calculation result as detection data;

a data processing device for acquiring distance data in a calculation angle region corresponding to a plurality of said distance calculations based upon the detection data obtained during a plurality of distance calculations; and a reliability calculating apparatus for calculating reliability of the distance data in a relevant calculated angle region based on a ratio between a sum of the detection data obtained and the number of distance calculations.

6. A distance calculating apparatus as claimed in claim 4, wherein said distance calculating apparatus calculates the distance to the object based upon the projected electromagnetic waves and the received reflection waves by way of a triangulation method, thereby using the calculated distance as the detection data.

7. A distance calculating apparatus as claimed in claim 4, wherein said data process determining apparatus invalidates the distance data when at least one of the detection data and the distance data within the calculation angle region cannot satisfy a preselected condition.

8. A distance calculating apparatus as claimed in claim 4, wherein said data precess determining apparatus invalidates the distance data when the reliability of said distance data is lower than a preselected value.

9. A distance calculating apparatus as claimed in claim 7, wherein said data process determining apparatus invalidates the distance data in the relevant calculation angle region when the number of detection data within the calculation angle region is smaller than a preselected value.

10. A distance calculating apparatus as claimed in claim 9, wherein said preselected value is determined in accordance with the distance data within the relevant calculation angle region.

11. A distance calculating apparatus as claimed in claim 7, wherein when an absolute value of a difference between a distance data value in a first calculation angle region and a distance data value in a second calculation angle region is smaller than a preselected value, said data process determining apparatus invalidates the distance data of such a calculation angle region in said first and second calculation angle regions where a detection data number is smaller than a detection data number of the other calculation angle region.

12. A distance calculating apparatus as claimed in claim 7, wherein when the number of detection data in the calculation angle region is smaller than a predetermined value and also a distribution for angles of the detection data in said calculation angle region is deviated more than a predetermined value, said data process determining apparatus invalidates the distance data in said calculation angle region.

13. A distance calculating apparatus as claimed in claim 7, wherein when the number of times at which the distance data is obtained in the same calculation angle region during a preselected scanning operation time period is smaller than a predetermined number, said data process determining apparatus invalidates all of the distance data in the relevant calculation angle region.

14. A distance calculating apparatus as claimed in claim 7, wherein said data process determining apparatus invalidates distance data when a temporal change between distance data values acquired from the same calculation angle region during a preselected scanning operation time period is larger than a predetermined value and a detection data number corresponding to said distance data is smaller than a preselected value.

15. A distance calculating apparatus as claimed in claim 6, wherein when the detection data of a first calculation angle region does not satisfy a predetermined condition but a detection data of a second calculation angle region located adjacent to said first calculation angle region satisfies said predetermined condition, said data process determining apparatus replaces distance data in the first calculation angle region with distance data in the second calculation angle region.

16. A distance calculating apparatus as claimed in claim 15, wherein when reliability of the distance data in the first calculation angle region is lower than a predetermined level, and reliability of the distance data in the second calculation angle region located adjacent to the first calculation angle region is higher than said predetermined value, said data process determining apparatus replaces the distance data in said first calculation angle region with the distance data in said second calculation angle region.

17. A distance calculating apparatus as claimed in claim 15, wherein when the detection data number within the first calculation angle region is smaller than the detection data number within the second calculation angle region, said data process determining apparatus replaces the distance data in the first calculation angle region with the distance data in the second calculation angle region.

18. A distance calculating apparatus as claimed in claim 15, wherein said data process determining apparatus replaces the distance data in said first calculation angle region with the distance data in said second calculation angle region when the detection data number in the first calculation angle region is smaller than the detection data number in the second calculation angle region and a difference in the distance data values between the first and second calculation angle regions is smaller than a predetermined value.

19. A distance calculating apparatus as claimed in claim 4, further comprising:
 a reliability calculating apparatus for calculating reliability of the distance data in a relevant calculation angle region based on the detection data within said relevant calculation angle region.

20. A distance calculating apparatus as claimed in claim 3, further comprising:
 a reliability calculating apparatus for calculating reliability of the distance data in a relevant calculation angle region based on the detection data within said relevant calculation angle region.

* * * * *